(12) United States Patent
Arunachalam et al.

(10) Patent No.: US 10,938,654 B2
(45) Date of Patent: Mar. 2, 2021

(54) SYSTEMS AND METHODS FOR PROFILING AND CLUSTERING NETWORK-CONNECTED DEVICES

(71) Applicant: Verizon Patent and Licensing Inc., Arlington, VA (US)

(72) Inventors: Harish Babu Arunachalam, Plano, TX (US); Srinivasan Krishnamurthy, Irving, TX (US); Safwan Aly, Plano, TX (US); Vipul Jha, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/448,047

(22) Filed: Jun. 21, 2019

(65) Prior Publication Data
US 2020/0403854 A1    Dec. 24, 2020

(51) Int. Cl.
*H04L 12/24*   (2006.01)
*H04L 29/12*   (2006.01)
*G06F 16/906*  (2019.01)

(52) U.S. Cl.
CPC ......... *H04L 41/082* (2013.01); *G06F 16/906* (2019.01); *H04L 41/28* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 2013/0235822 A1* | 9/2013 | Scherer | H04L 12/2887 370/329 |
| 2015/0148021 A1* | 5/2015 | Jeyakeerthi | H04W 8/24 455/418 |
| 2017/0171580 A1* | 6/2017 | Hirsch | H04N 21/6125 |
| 2017/0374668 A1* | 12/2017 | Tran | H04L 67/34 |

* cited by examiner

*Primary Examiner* — Jeffrey R Swearingen

(57) ABSTRACT

A network device determines when multiple users each connect to a network using one or more devices. The network device obtains device or network-related parameters associated with the one or more devices and generates profiling vectors for each of the multiple users, that connects to the network using the one or more devices, to produce multiple profiling vectors. The network device clusters the multiple profiling vectors to identify cluster centers associated with a plurality of user groups, and determines first users of the multiple users for, or with, whom to perform certain actions or activities based on the first users' affinity with one or more of the plurality of user groups. The network device performs the certain actions or activities with respect to the determined first users.

20 Claims, 16 Drawing Sheets

SYSTEMS AND METHODS FOR PROFILING AND CLUSTERING NETWORK-CONNECTED DEVICES

BACKGROUND

Various different devices may be used by a network customer (i.e., a user) to connect to a network operated by a network service provider. In some circumstances, a user may use multiple different devices to connect to the network via a network access device, such as a modem or router, that may be owned by the network service provider. For example, a wireless (e.g., Wi-Fi) router may be installed at a user's premises, and the user may access the network service provider's network via the wireless router using multiple different wireless devices (e.g., laptop, phone, gaming console, tablet, smart speaker, etc.). In some situations, the network service provider (or other entity) may desire to perform a certain action with respect to a subset of the network customers, or to engage a certain subset of customers in certain activities. For example, certain customers may use a particular device to connect to the network that requires a firmware upgrade. As another example, a certain subset of customers may be identified as likely to suffer a network service disruption. In such circumstances, the network service provider may find it necessary, or desirable, to have the capability to easily identify the particular customers with whom a certain action is to be performed, or with whom to engage in a certain activity.

DETAILED DESCRIPTION OF THE PREFERRED EMBODIMENTS

Figure 1:
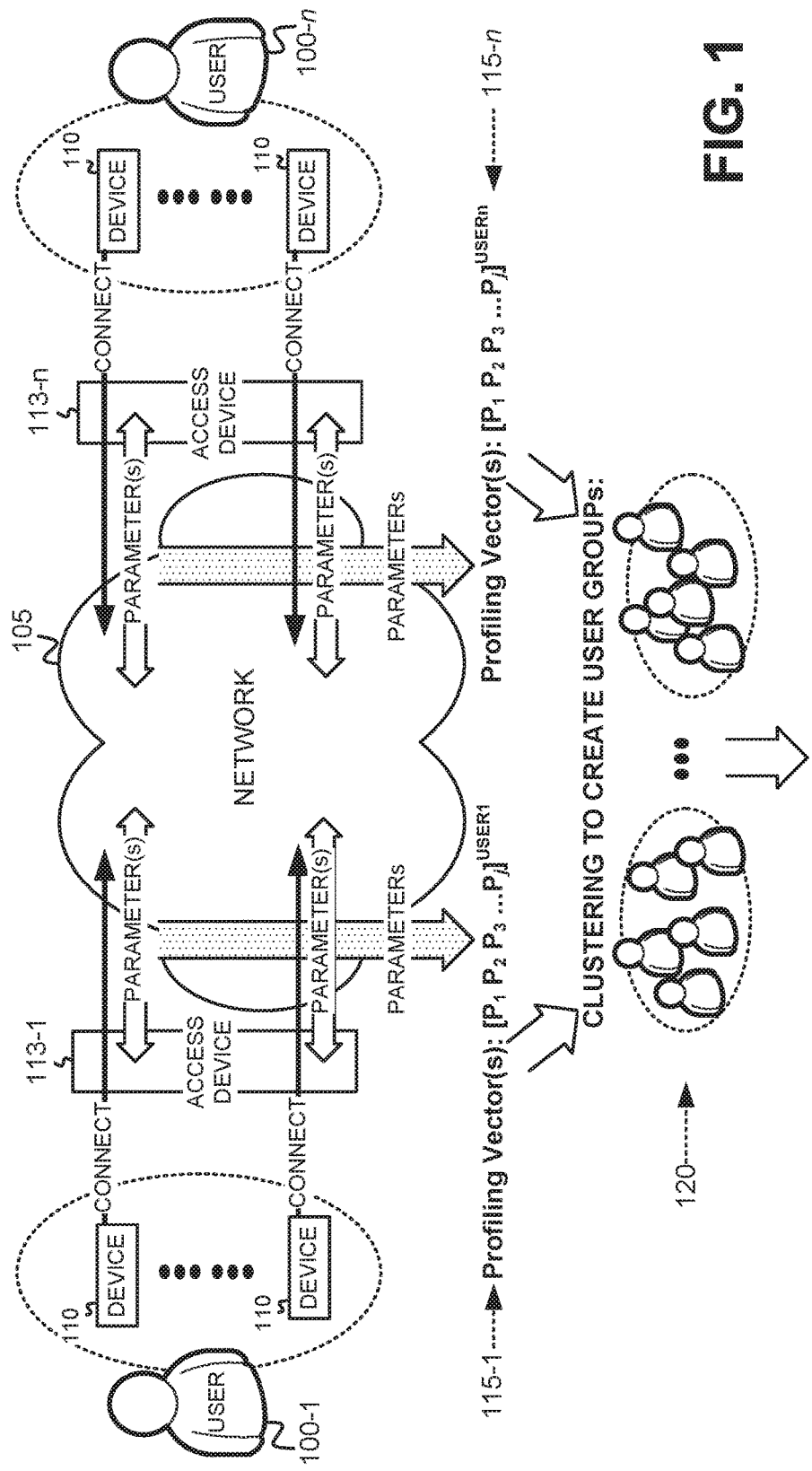
FIG. 1 is a diagram that depicts an overview of the profiling and clustering of user devices that connect to a network service provider's network.

The following detailed description refers to the accompanying drawings. The same reference numbers in different drawings may identify the same or similar elements. The following detailed description does not limit the invention.

In embodiments described herein, a profiling server may profile users/customers, and their user devices, that connect to a network, and uses those profiles to cluster the users into user groups that, in turn, may be used to identify particular users with whom certain actions are to be performed, or with whom to engage in certain activities. To profile the users, the profiling server obtains network communication protocol parameters associated with connecting the users' one or more user devices to the network and generates one or more profiling vectors for each of the users based on the obtained network communication protocol parameters. To cluster the users, the profiling server applies a clustering algorithm to the users' generated profiling vectors to create multiple groups of users. The clustering algorithm may, for example, use the profiling vectors to group users into particular user groups based on similar network communication protocol parameters, similar properties, similar user behavior, etc. The profiling server may then identify users having affinities with particular created user groups based on, for example, application of an algorithm to each user's profiling vector and to centroids (i.e., cluster centers) of each of the user groups generated by the clustering algorithm.

The profiling server, or a different network device(s), may perform actions or activities for/with the identified users based on their determined user group affinities. The actions or activities may include, for example, identifying the users' devices that require a firmware or software upgrade, or a software patch, based on their respective user group affinities, and initiating the upgrade with those users' devices. The actions or activities may further include, for example, identifying users that are likely to suffer a network service disruption based on their user group affinities, and sending a notification of the service disruption to the identified users. The actions or activities may also include, for example, targeting notifications and/or firmware/software upgrades to particular users that have user group affinities with a particular user group(s) associated with an occurrence of a network security event, or associated with a known network security vulnerability or risk. The profiling and clustering techniques described herein, however, may be used to target users and/or the users' device(s) for the performance of other types of actions or activities. The profiling and clustering techniques described herein are based on automatically collected user and device information that do not require users to manually provide any information to the network service provider. Additionally, the clustering techniques described herein create user groups through automated user device detection based on, for example, parameters derived from network communication protocols.

FIG. 1 is a diagram that depicts an overview of the profiling and clustering of user devices that connect to a network service provider's network. As shown, multiple users 100-1 through 100-*n* may use one or more different devices 110 to connect with the network service provider's network 105 via a respective access device 113. Network 105 may include any type of network operated by a network service provider, such as any type of wired or wireless network. As an example of a wired network, network 105 may include a Public Switched Telephone Network (PSTN) or a fiber optic cable network (e.g., Verizon™ FiOS). As an example of a wireless network, network 105 may include a Public Land Mobile Network (PLMN) or a satellite network. Network 105 may interconnect with another network (not shown) via, for example, a gateway, such that devices 110 connected to network 105 may send and/or receive data across network 105 to/from destination devices in the other network. The other network may, in some implementations, include the Internet.

Access devices 113-1 through 113-*n* may each include a wired and/or wireless modem, router, and/or modem/router combination, a base station (e.g., eNB or gNB), or any other type of wired or wireless device that serves as a network access point to the network 105. An access device 113 may include, in one example, a modem/router combination that includes wireless functionality for implementing a wireless local area network (LAN) (e.g., Wi-Fi) that enables devices 110 to wirelessly connect to network 105 via the wireless LAN. The access device 113 may also include, in another example, functionality for implementing a wired LAN that enables devices 110 to connect to network 105 via a wired connection to access device 113. The devices 110 may each include any type of electronic device that includes wired and/or wireless communication capabilities. The devices 110 may each include, for example, a desktop, laptop, palmtop or tablet computer; a cellular telephone (e.g., a "smart" phone); a personal digital assistant (PDA); a music player (e.g., a digital audio player); a digital camera; an Internet of Things (IoT) or Machine-to-Machine (M2M) device; an audio speaker(s) (e.g., a "smart" speaker); a "smart" television; or a video gaming device.

During connection of each user device 110 to network 105 via a respective access device 113, parameters associated with each device 110, such as, for example, network communication protocol parameters, may be exchanged between access device 113 and network 105. In one implementation, the network communication protocol parameters include Technical Report 069 (TR-069) parameters. TR-069 includes an application layer protocol for the remote management of customer premises equipment (CPEs) that connect to a network. In other implementations, however, other parameters associated with network communication protocols that are different than TR-069 may be used. The TR-069 parameters may include various different device or network-related parameters exchanged between each respective access device 113 and network 105 upon establishment of a connection between a device 110 and network 105 via the access device 113. The TR-069 parameters may, for example, include Medium Access Control (MAC) addresses assigned to each device 110, and a host name associated with each device 110. The host name may include a label that is used to differentiate each device 110 from other devices. In some implementations, a host name may include a fully qualified domain name (FQDN) that uniquely identifies devices connected to the Internet via the Domain Name Service (DNS) naming hierarchy. Each respective access device 113, or another network device(s) (not shown) within or connected to network 105, may obtain the network communication protocol parameters (e.g., TR-069 parameters) associated with each network-connected device 110, and may supply those parameters to a profiling server (not shown).

The profiling server may, for each user 100, generate one or more profiling vectors based on the supplied network communication protocol parameters. The one or more profiling vectors may include, for example, probabilities associated with the manufacturers of each device 110 and/or associated with a category (i.e., a type of device) of each device 110 used by a user 100 to connect to network 105. For example, as shown in FIG. 1, one or more profiling vectors 115-1 may be generated for user 100-1 that has used multiple user devices 110 to connect to network 105, and one or more profiling vectors 115-*n* may be generated for user 100-*n* that has used multiple user devices 110 to connect to network 105. Further details of one exemplary implementation of the generation of the one or more profiling vectors are described further below with respect to FIGS. 10A and 10B.

The profiling server may then perform a clustering technique (indicated at element 120 in FIG. 1), based on the generated profiling vectors for the users 100, to create multiple user groups. In one implementation, the clustering technique may include using a K-means clustering algorithm that determines a cluster center (e.g., a centroid) for each user group based on the profiling vectors for the user 100. The grouping of particular users into groups indicate certain affinities that the users in each group may have. For example, if users often use Samsung™ smart phones to connect to network 105, then those users may be grouped into a user group associated with Samsung™ smart phones. Further details of one exemplary implementation of a clustering technique are described further below with respect to FIG. 11.

The profiling server may then identify (indicated at element 125 in FIG. 1) particular users of users 100-1 through 100-*n* that have certain user group affinities. In one implementation, each user 100's profiling vector(s) may be used to determine a Euclidian distance between the profiling vector and each centroid of each user group to generate a user group affinity score for that user 100. The generated user group affinity score for the user 100 may be used to identify whether the user 100 has an affinity for that particular user group. Further details of one exemplary implementation of user group affinity identification are described further below with respect to FIGS. 14 and 15.

The profiling server, or another network device(s), may perform certain actions or activities for/with certain users 100 based on their identified user group affinities (indicated at element 130 in FIG. 1). For example, for users 100 determined to have affinity scores indicating an affinity with a particular user group, then actions or activities that are targeted to that user group may be performed for/with the users 100. The actions/activities may include, for example, targeting firmware upgrades to particular users that have an affinity with a particular user group due to the particular devices that the users operate to connect to the network. The actions/activities may further include, for example, targeting notifications to users that have an affinity with a particular user group associated with a likely network service disruption. The actions/activities may additionally include determining user groups that a particular user has affinities with, analyzing network-related issues resolved with respect to other users in the determined user groups, and providing recommendations to the user regarding remedial measures that were taken to resolve the network-related issues for the other users in the determined user groups. The actions/activities may also include targeting ad campaigns, network service upgrades, and/or device upgrades to particular users based on those users' affinities with one or more user groups.

Figure 2:
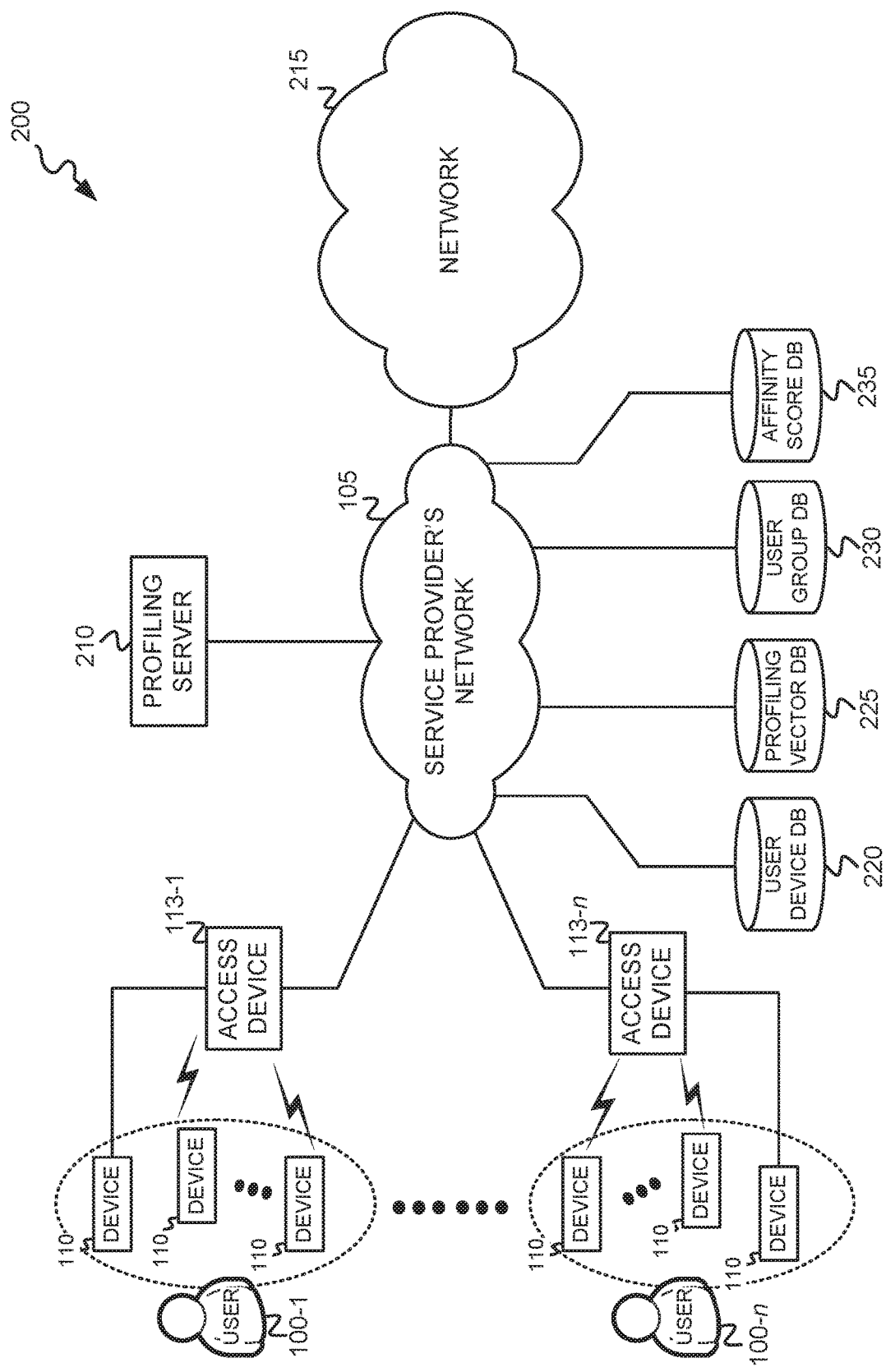
FIG. 2 is a diagram that depicts an exemplary environment in which users, and their user devices that connect to a network, are profiled and clustered for use in targeting those devices for certain actions or activities.

FIG. 2 is a diagram that depicts an exemplary environment 200 in which users 100, and their user devices 110 that connect to a network service provider's network 105, are profiled and clustered for use in targeting those devices for certain actions or activities. Network environment 200 may include network service provider's network 105, access devices 11305-1 through 113-n, a profiling server 210, a user device database (DB) 220, a profiling vector DB 225, a user group DB 230, an affinity score DB 235, and a network 215.

Network 105 may include any type of network operated by a network service provider, such as any type of wired or wireless network. As an example of a wired network, network 105 may include a PSTN or a fiber optic cable network. As an example of a wireless network, network 105 may include a PLMN or a satellite network. Network 105 may interconnect with another network 215 via, for example, a gateway (not shown) such that devices connected to network 105 may send and/or receive data across network 105 to/from destination devices in network 215.

Access devices 113-1 through 113-n (generically referred to herein as "access device 113" or "access devices 113"), as already described above, may each include a wired and/or wireless modem, router, and/or modem/router combination, a base station (e.g., eNB or gNB), or any other type of wired or wireless device that serves as a network access point to the network 105. As shown, a user 100-1 may use multiple different devices 110 to connect, via wired or wireless links, to network 105 via access device 113-1. As further shown, a user 100-n may also use multiple different devices 110 to connect, via wired or wireless links, to network 105 via access device 113-n. In some implementations, access devices 113 may implement wired local area networking such that devices 110 may use a wired connection for accessing network 105 via the access devices 113. In some implementations, instead of, or in addition to the wired local area networking, access devices 113 may include wireless access technology that enables wireless local area networking (e.g., Wi-Fi) of one or more of devices 110 such that the devices 110 may use a wireless connection for accessing network 105 via access device 113.

Profiling server 210 may include one or more network devices that execute the processes described herein for profiling and clustering users 100, and their devices 110 that connect to network 105. In some implementations, profiling server 210 (or another network device(s) not shown) may additionally, based on the profiling and clustering users 100 and their devices 110 into user groups, target particular users of the users 100 for certain actions or activities based on determined affinities between those users 100 and the clustered user groups. Profiling server 210 may implement the functional components described with respect to FIG. 4 below.

User device DB 220 may include one or more network devices that further include memory storage components that store a data structure containing information related to devices 110 of users 100 that connect to network 105 via a respective access device 113. One exemplary implementation of user device DB 220 is described below with respect to FIG. 5.

Profiling vector DB 225 may include one or more network devices that further include memory storage components that store a data structure containing profiling vectors for users 100 that use one or more devices 110 to connect to network 105 via a respective access device 113. The profiling vectors may include data associated with the probabilities that each respective user 100 uses particular types of devices 110 to connect to network 105. The particular types of devices 110 may include, for example, particular device manufacturers (e.g., Apple™, Amazon™, Samsung™, etc.) and/or particular categories of devices 110 (e.g., smart phone, gaming device, IoT device, etc.). One exemplary implementation of profiling vector DB 225 is described below with respect to FIG. 6.

User group DB 230 may include one or more network devices that further include memory storage components that store a data structure identifying user groups, and their associated data, that group users 100 that connect to network 105 using devices 110 into one or more respective groups based on, for example, profiling vectors associated with each user 100. One exemplary implementation of user group DB 230 is described below with respect to FIG. 7.

Affinity score DB 235 may include one or more network devices that further include memory storage components that store a data structure that identifies a determined affinity that each user 100 has with the user groups identified in DB 230. In one exemplary implementation, the affinity that each user 100 has with each user group may be based on a Euclidian distance between the user 100's profiling vector and a centroid associated with each user group. One exemplary implementation of affinity score DB 235 is described below with respect to FIG. 8.

Network 215 may include one or more networks of various different types. For example, network 215 may include a wireless PLMN(s), a wireless satellite network(s), and/or other type(s) of wireless network(s) (e.g., wireless ad-hoc networks, wireless Wide Area Networks (WANs), wireless LANs). The PLMN(s) may include a Code Division Multiple Access (CDMA) 2000 PLMN, a Global System for Mobile Communications (GSM) PLMN, a Long Term Evolution (LTE) PLMN, a Fifth Generation (5G) PLMN, and/or other types of PLMNs. As a further example, network 215 may include a wired telecommunications network (e.g., a PSTN), a local area network (LAN), a wide area network (WAN), a metropolitan area network (MAN), an intranet, the Internet, and/or a cable network (e.g., an optical cable network).

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, DBs 220-235 may be combined into a single or distributed data structure.

Figure 3:
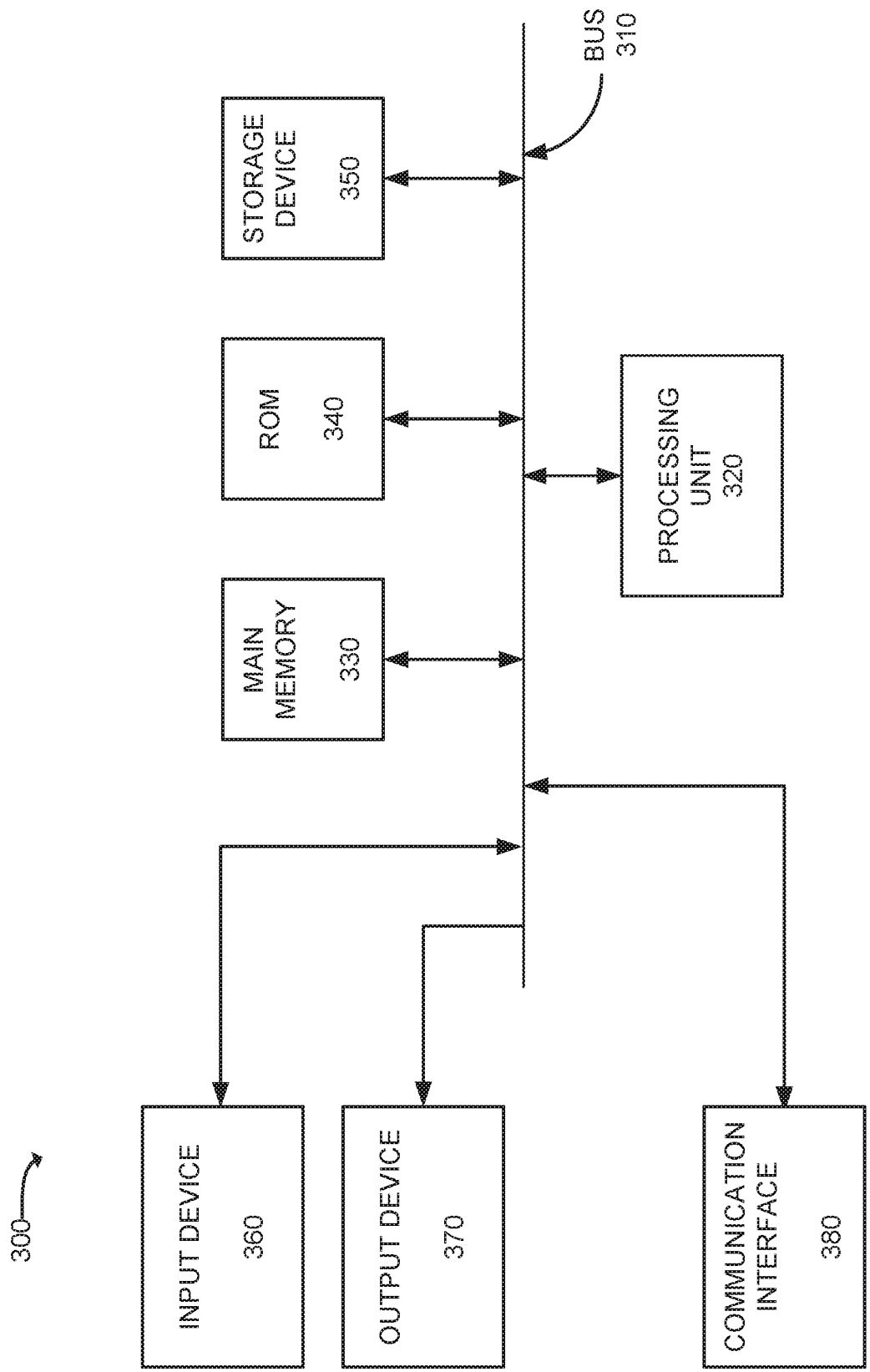
FIG. 3 is a diagram that depicts exemplary components of a network device that may correspond to the profiling server, user devices, access devices, and/or databases of FIG. 2.

FIG. 3 is a diagram that depicts exemplary components of a network device 300. Profiling server 210, devices 110, access devices 113, and DBs 220, 225, 230, and 235 may each include components the same as, or similar to, the network device 300 shown in FIG. 3, arranged in an identical configuration, or a similar configuration, as that shown in FIG. 3. Network device 300 may include a bus 310, a processing unit 320, a main memory 330, a read only memory (ROM) 340, a storage device 350, an input device 360, an output device 370, and a communication interface 380. Bus 310 may include a path that permits communication among the other components of network device 300.

Processing unit 320 may include one or more processors or microprocessors which may interpret and execute stored instructions associated with one or more processes, or processing logic that implements the one or more processes. For example, processing unit 320 may include, but is not limited to, programmable logic such as Field Programmable Gate Arrays (FPGAs) or accelerators. Processing unit 320 may include software, hardware, or a combination of software and hardware for executing the processes described herein. Main memory 330 may include a random access memory (RAM) or another type of dynamic storage device that may store information and, in some implementations, instructions for execution by processing unit 320. ROM 340 may include a ROM device or another type of static storage device (e.g., Electrically Erasable Programmable ROM (EEPROM)) that may store static information and, in some implementations, instructions for use by processing unit 320. Storage device 350 may include a magnetic, optical, and/or solid state (e.g., flash drive) recording medium and its corresponding drive. Main memory 330, ROM 340 and storage device 350 may each be referred to herein as a "non-transitory computer-readable medium" or a "non-transitory storage medium." The process/methods set forth herein can be implemented as instructions that are stored in main memory 330, ROM 340 and/or storage device 350 for execution by processing unit 320.

Input device 360 may include one or more devices that permit an operator to input information to network device 300, such as, for example, a keypad or a keyboard, a display with a touch sensitive panel, voice recognition and/or biometric mechanisms, etc. Output device 370 may include one or more devices that output information to the operator, including a display, a speaker, etc. Input device 360 and output device 370 may, in some implementations, be implemented as a user interface (UI) that displays UI information and which receives user input via the UI. Communication interface 380 may include one or more transceivers that enable network device 300 to communicate with other devices and/or systems. For example, communication interface 380 may include one or more wired or wireless transceivers for communicating via network 105 and/or 215.

Network device 300 may perform certain operations or processes, as may be described herein. Network device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes only. Other configurations may be implemented. Therefore, network device 300 may include additional, fewer and/or different components, arranged in a different configuration, than depicted in FIG. 3.

Figure 4:
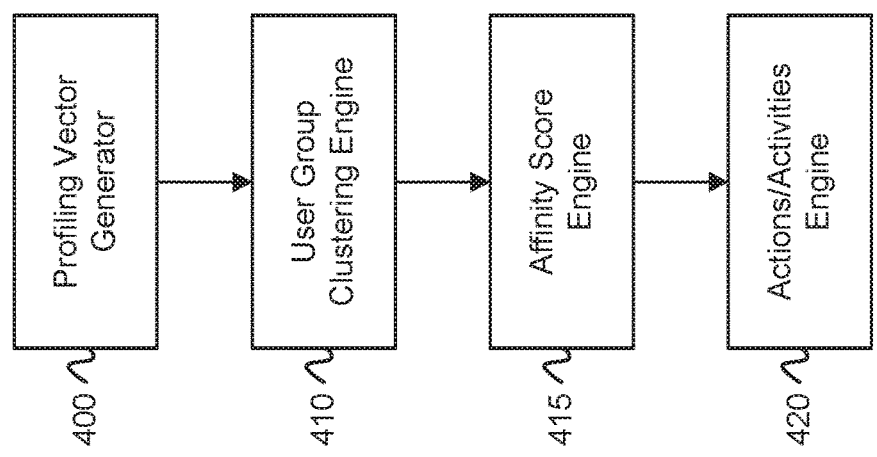
FIG. 4 is a diagram that illustrates exemplary functional components of the profiling server of FIG. 2.
Figure 4:

FIG. 4 is a diagram that illustrates exemplary functional components of profiling server 210. Each of the generators/engines/units shown in FIG. 4 may be implemented as software instructions executed by processing unit 320 of a network device 300, or as hardware, or a combination of hardware and software. Profiling server 210 may include a profiling vector generator 400, a user group clustering engine 410, and an affinity score engine 415. In some implementations, profiling server 210 may additionally include an actions/activities engine 420. In other implementations, actions/activities engine 420 may be implemented by one or more other network devices.

Profiling vector generator 400 generates one or more profiling vectors for each user 100 that connects to network 105 using one or more user devices 110. In one implementation, profiling vector generator 400 may generate a first profiling vector associated with the probabilities that the user 100 will connect to network 105 using a device manufactured by a particular manufacturer of multiple different manufacturers, and a second profiling vector associated with the probabilities that the user 100 will connect to network 105 using a device 110 of a particular category (e.g., a particular type of device 110) of multiple different categories. One exemplary implementation of the generation of profiling vectors by profiling vector generator 400 is described with respect to FIGS. 10A and 10B below.

User group clustering engine 410 obtains the one or more profiling vectors from generator 400 and executes a clustering algorithm to determine cluster centers of multiple user groups. In one implementation, the clustering algorithm may include a K-means clustering algorithm. Other clustering algorithms, however, may alternatively be used. One exemplary implementation of the execution of clustering to determine cluster centers and create user groups, by clustering engine 410, is described with respect to FIGS. 11-13 below.

Affinity score engine 415 determines, for each user 100, an affinity score(s) between each user group created by engine 410 and that user 100's profiling vector(s). In one implementation, engine 415 may determine a Euclidian distance between the user 100's profiling vector(s) and the centroid (i.e., cluster center) associated with each user group. One exemplary implementation of the determination of an affinity score(s) for each user 100 is described with respect to FIG. 14 below. In one implementation, the determined affinity score(s) for each user may be provided to actions/activities engine 420. In other implementations, the determined affinity score(s) for each user 100 may be provided to another network device(s), other than profiling server 210.

Actions/activities engine 420 identifies one or more user groups that are associated with the performance of a particular action or activity, and then determines users 100 having an affinity with the identified one or more user groups based on the user group affinity score(s) determined by engine 415 for each user 100. In one implementation, actions/activities engine 420 performs the particular action or activity involving the users determined to have an affinity with the identified one or more user groups. In other implementations, actions/activities engine 420 may provide identifications of users 100 determined to have an affinity with one or more user groups to another network device(s), other than profiling server 210, for performance of the actions or activities.

The configuration of the functional components of profiling server 210 illustrated in FIG. 4 is for illustrative purposes only. Other configurations may be implemented. Therefore, profiling server 210 may implement additional, fewer and/or different functions than those shown in FIG. 4.

Figure 5:
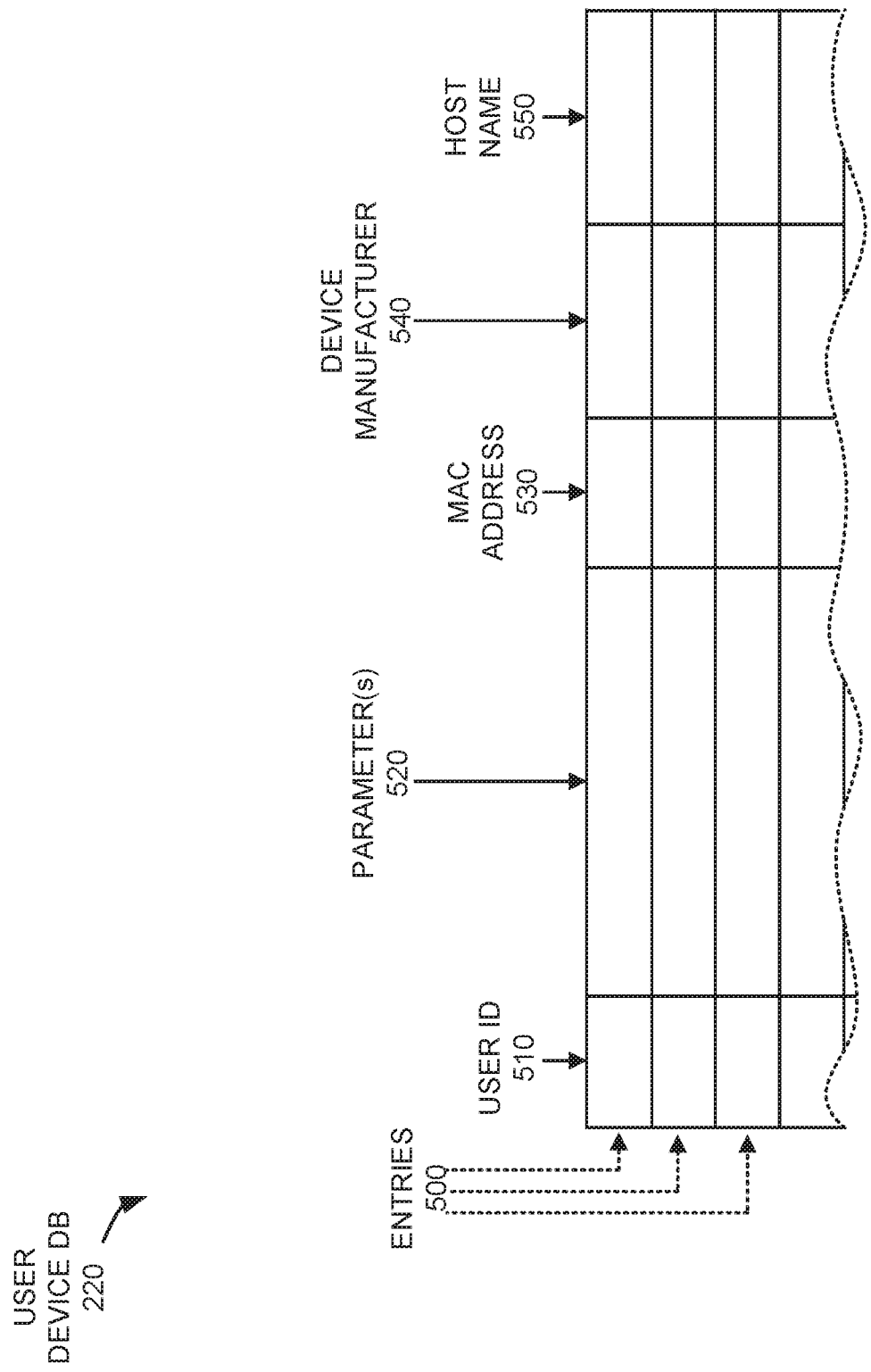
FIGS. 5-8 illustrate exemplary implementations of data structures that may be stored in the user device database, the profiling vector database, the user group database, and the affinity score database of FIG. 2.

FIG. 5 illustrates one exemplary implementation of a data structure that may be stored in user device DB 220. As shown, the data structure may include multiple entries 500, with each entry 500 including a user identifier (ID) field 510, a parameter(s) field 520, a Medium Access Control (MAC) field 530, a device manufacturer field 540, and a host name field 550.

User ID field 510 stores a globally unique ID for a particular user 100. Parameter(s) field 520 stores one or more network communication protocol parameters (e.g., TR-069 protocol parameters) obtained by a respective access device 113 during connection establishment between a particular device 110 of user 100 and the network 105 via the access device 113. MAC address field 530 stores a MAC address associated with a particular user device 110, the network communication protocol parameters of which are stored in field 520, that the user 100, identified in user ID field 510 of entry 500, used to connect to network 105. Device manufacturer field 540 stores an ID (e.g., name) associated with the manufacturer that manufactured the device 110 having the MAC address stored in field 530 of entry 500. Host name field 550 stores the host name of the device 110 having the MAC address stored in field 530 of entry 500.

Figure 6:
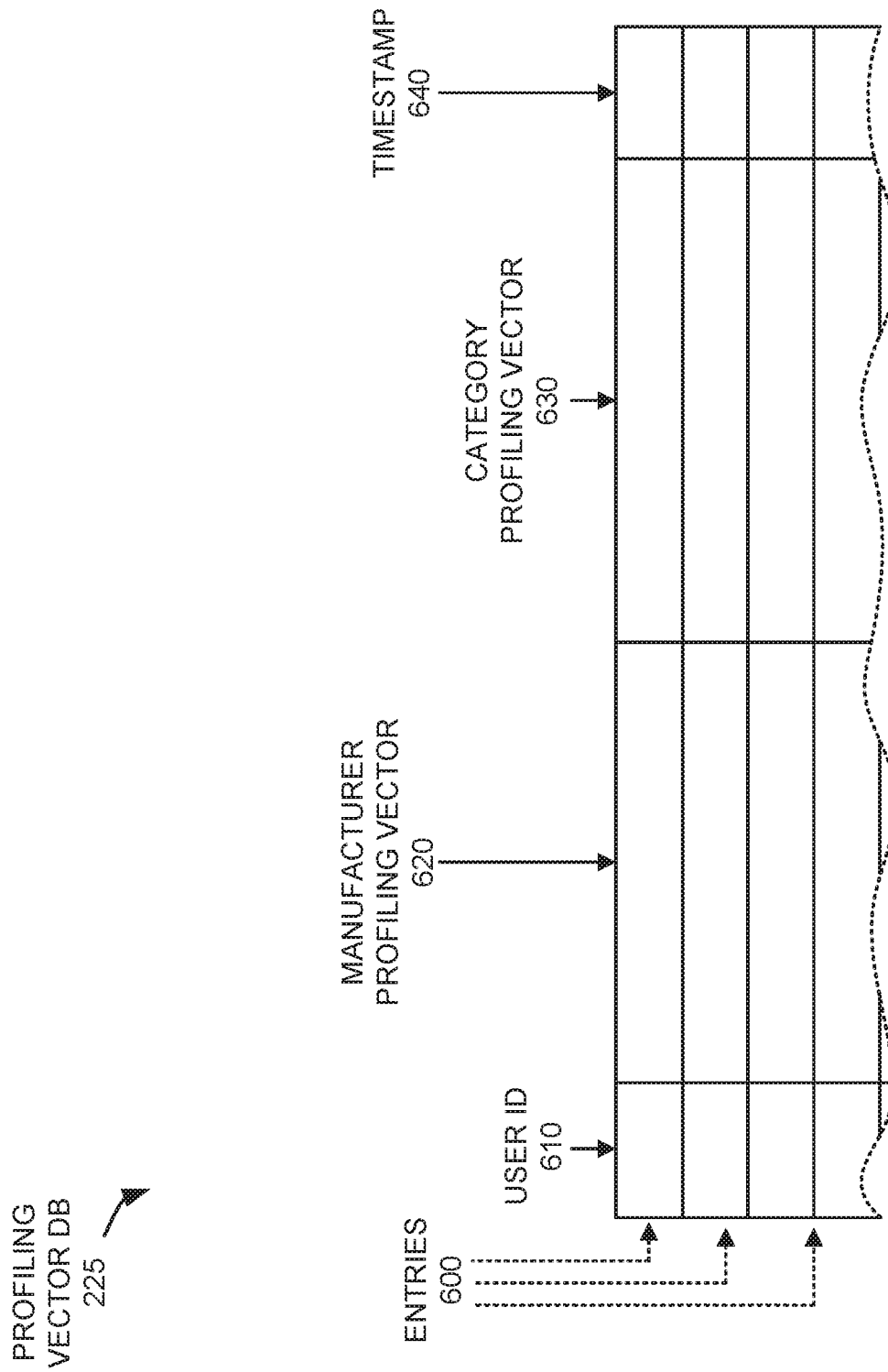

FIG. 6 illustrates one exemplary implementation of a data structure that may be stored in profiling vector DB 225. As shown, the data structure may include multiple entries 600, with each entry 600 including a user ID field 610, a manufacturer profiling vector field 620, a category profiling vector field 630, and a timestamp field 640.

User ID field 610 stores the globally unique ID for each particular user 100. Manufacturer profiling vector field 620 stores a manufacturer profiling vector, such as that determined in block 1050 of the process of FIGS. 10A and 10B, for the user identified in field 610 of the entry 600. Category profiling vector field 630 stores a category profiling vector, such as that determined in block 1055 of the process of FIGS. 10A and 10B, for the user identified in field 610 of the entry 600. Timestamp field 640 stores a timestamp (e.g., a date and/or time) at which the profiling vectors stored in fields 620 and 630 were determined for the user identified in field 610 of the entry 600.

Figure 7:
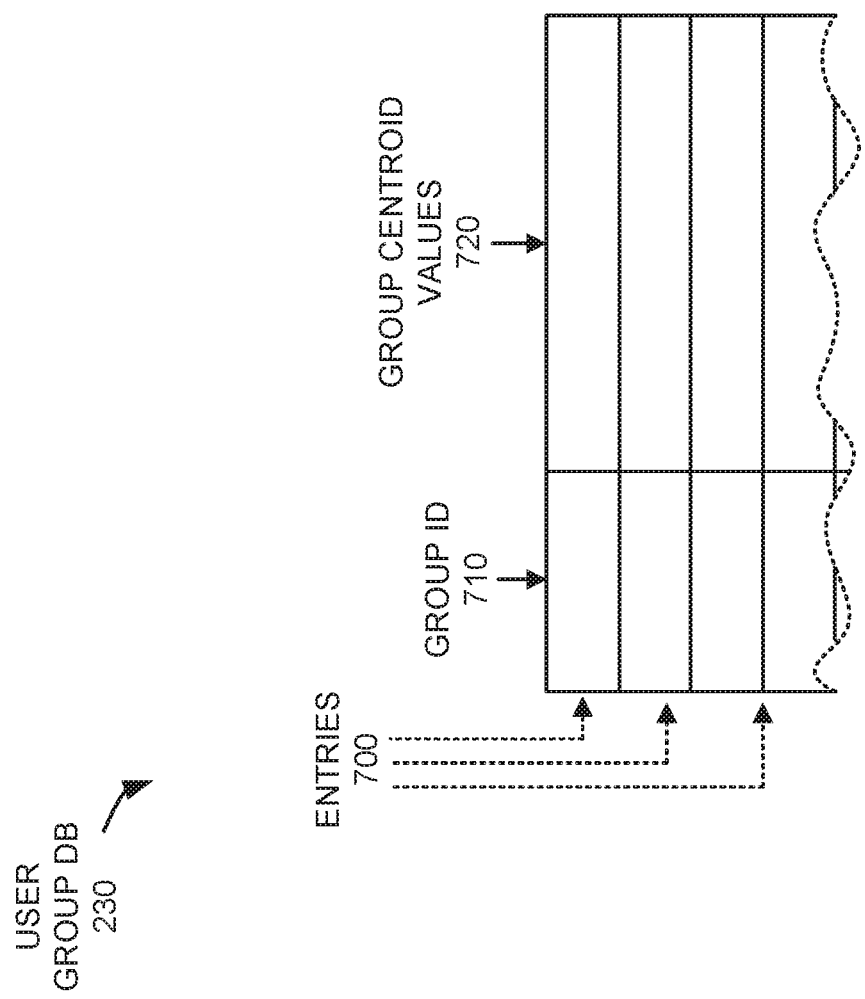

FIG. 7 illustrates one exemplary implementation of a data structure that may be stored in user group DB 230. As shown, the data structure may include multiple entries 700, with each entry 700 including a group ID field 710 and a group centroid values field 720.

Group ID field 710 stores a unique ID associated with a particular user group of multiple different user groups. Upon creation of user groups in block 930 of FIG. 9 (described below), profiling server 210 may assign a unique ID to each of the created user groups. Group centroid values field 720 stores values for the cluster center, such as determined blocks 1115 and/or 1125 of FIG. 11 (described below), for the particular user group identified in field 710 of the entry 700.

Figure 8:
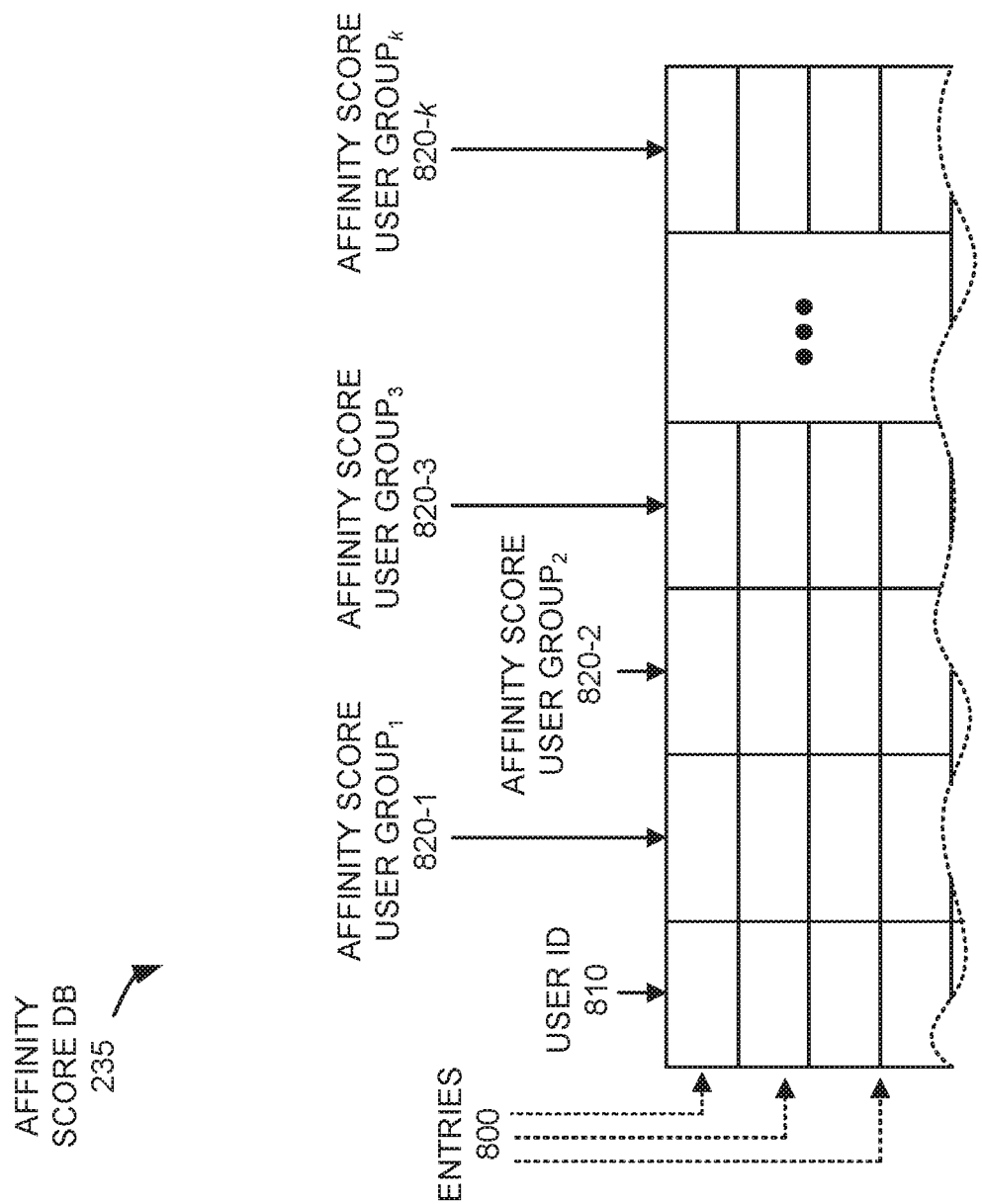

FIG. 8 illustrates one exemplary implementation of a data structure that may be stored in affinity score DB 235. As shown, the data structure may include multiple entries 800, with each entry 800 including a user ID field 810, and affinity score fields for user groups 1-$k$ (e.g., user group$_1$ affinity score field 820-1 through user group$_k$ affinity score field 820-$k$).

User ID field 810 stores the globally unique ID for each particular user 100. Affinity score user group$_1$ field 820-1 stores an affinity score associated with a determined affinity between the user identified in field 810 of entry 800 and user group$_1$. Affinity score user group$_2$ field 820-2 stores an affinity score associated with a determined affinity between the user identified in field 810 of entry 800 and user group$_2$. Affinity score user group$_3$ field 820-3 stores an affinity score associated with a determined affinity between the user identified in field 810 of entry 800 and user group$_3$. Affinity score user group$_1$ field 820-$k$ stores an affinity score associated with a determined affinity between the user identified in field 810 of entry 800 and user group$_k$. The affinity scores of the k user groups of fields 820-1 through 820-$k$ may have been determined in block 940 of FIG. 9 (described below).

To locate a particular entry 500, 600, 700, or 800 of DBs 220-235, the data structures of DBs 220-235 may be queried with particular data to locate a respective entry 500-800 having matching data stored in a particular one of the fields of that entry. When such an entry is located, data may be stored in one or more fields of the identified entry, or data may be retrieved from one or more fields of the identified entry. For example, if a particular user ID of a user 100 is known, then the entries 500 of user device DB 220 may be queried with the user ID to locate an entry 500 having a matching user ID stored in field 510. Upon location of an entry 500 having a matching user ID stored in field 510, data may be retrieved from, or stored in, fields 520, 530, 540, and/or 550 of the located entry 500.

The data structures of DBs 220-235 are depicted as including tabular data structures with certain numbers of fields having certain content. The tabular data structures shown in FIGS. 5-8, however, are for illustrative purposes. Other types of data structures may alternatively be used. The number, types, and content of the entries and/or fields in the data structures illustrated in FIGS. 5-8 are also for illustrative purposes. Other data structures having different numbers of, types of and/or content of, the entries and/or the fields may be implemented. Therefore, the data structures depicted in FIGS. 5-8 may each include additional, fewer and/or different entries and/or fields than those shown.

Figure 9:
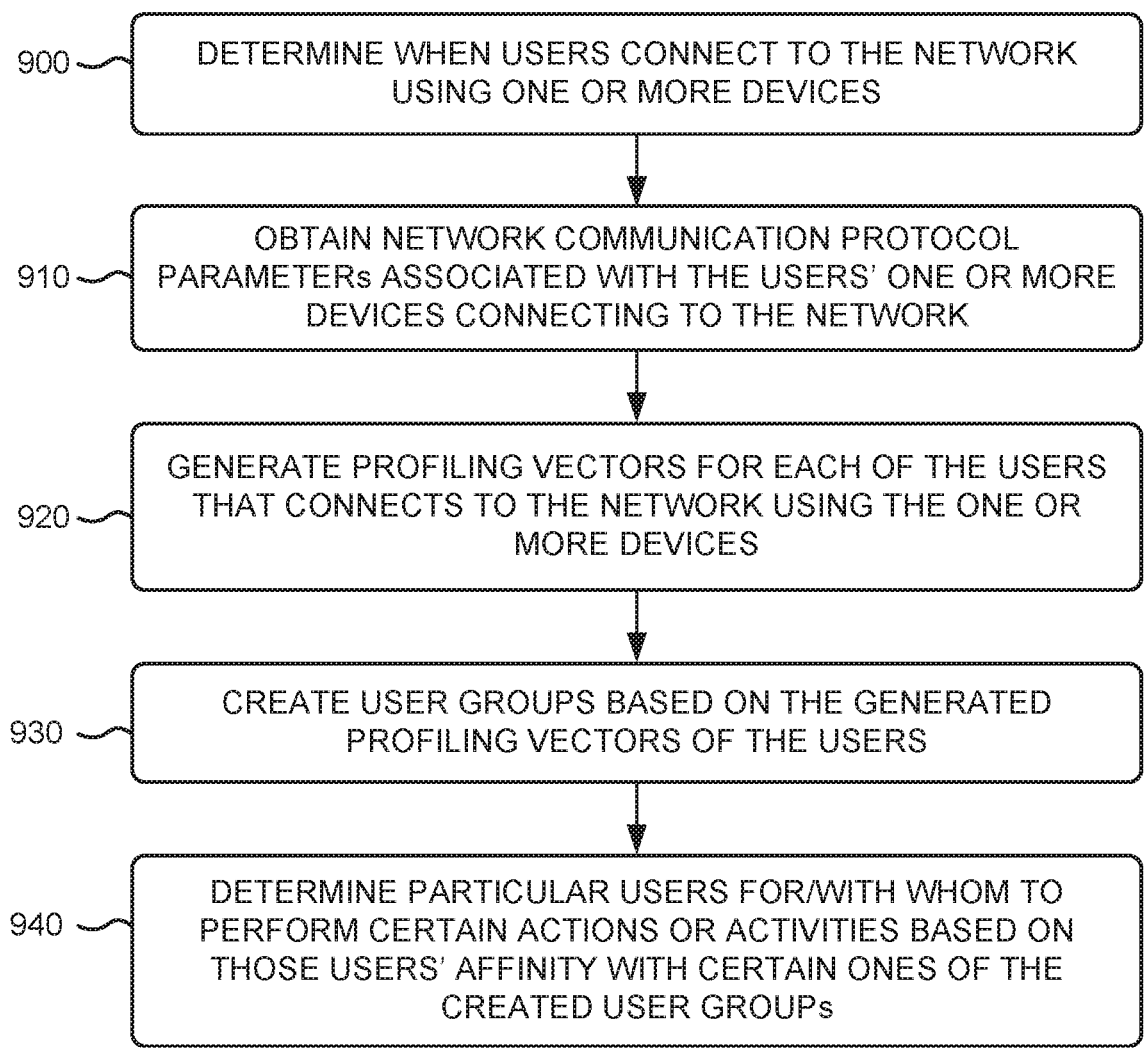
FIG. 9 is a flow diagram that illustrates an exemplary process for generating profiling vectors for user devices that connect to a network, creating user groups based on clustering of the generated profiling vectors, and using the created user groups to determine particular users for/with whom to perform certain actions or activities.

FIG. 9 is a flow diagram that illustrates an exemplary process for generating profiling vectors for user devices 110 that connect to a network service provider's network 105, creating user groups based on clustering of the generated profiling vectors, and using the created user groups to determine particular users for/with whom to perform certain actions or activities. The exemplary process of FIG. 9 may be implemented, at least in part, by profiling server 210.

The exemplary process includes profiling server 210 determining when users 100 connect to the service provider's network 105 using one or more devices 110 (block 900). For example, referring to FIG. 2, user 100-1 may use a wireless link to connect a device 110 to network 105 via access device 113-1. Access device 113-1 may include wireless local area network (LAN) (e.g., Wi-Fi) functionality, and device 110 may connect to access device 113-1 via the wireless LAN which, in turn, connects device 110 to network 105 via a wired or wireless link.

Profiling server 210 obtains network communication protocol parameters associated with the users' one or more devices connecting to the network 105 (block 910). In one implementation, the network communication protocol parameters may include TR-069 protocol parameters. As a user 100 uses a device 110 to connect to network 105 via an access device 113, network communication protocol parameters (e.g., TR-069 parameters) may be exchanged between components of network 105 and access device 113-1 and/or device 110. The TR-069 parameters may include, but are not limited to, the MAC address of the device 110 and the host name of the device 110. Other TR-069 parameters may additionally, or alternatively, be used. The access device 113, or other components of network 105, may supply the network communication protocol parameter(s) to profiling server 210 upon connection establishment between the device 110 and network 105 via the access device 113. As described in further detail below, profiling server 210 may determine a particular manufacturer for each device 110 based on its MAC address, and a particular category of each device 110 based on its host name.

Profiling server 210 generates profiling vectors for each of the users 100 that connects to the network 105 using the one or more devices 110 (block 920). In one implementation, profiling server 210 may determine a probability that each user 100 connects to network 105 using a device 110 manufactured by particular manufacturers. In a simplified example, if the devices 110 may possibly be manufactured by the following set of manufacturers: {$manuf_1$, $manuf_2$, $manuf_3$}, and a user 100 connects to network 105 using a first device 110 manufactured by $manuf_1$, a second device 110 manufactured by $manuf_1$, and a third device 110 manufactured by $manuf_3$, then the probability of user 100 connecting to network 105 using a device manufactured by $manuf_1$ would be $P_{manuf1}=2/3$. Further, the probability of user 100 connecting to network 105 using a device 110 manufactured by $manuf_2$ would be $P_{manuf2}=0/3=0$, and the probability of user 100 connecting to network 105 using a device 110 manufactured by $manuf_3$ would be $P_{manuf3}=1/3$.

Additionally, or alternatively, profiling server 210 may determine a probability that each user 100 connects to network 105 using certain categories of devices 110. The certain categories of devices 110 may include, for example, IoT devices, tablets, TVs, speakers, laptops, and phones. Other types of devices, however, may be included within the possible categories of devices 110 that a user 100 may use to connect to network 105. In a simplified example, if the devices 110 may possibly include the following categories of devices 110: {$cat_1$, $cat_2$, $cat_3$}, and a user 100 connects to network 105 using a first device 110 having a category of $cat_2$, a second device 110 having a category of $cat_2$, and a third device 110 having a category of $cat_1$, then the probability of user 100 connecting to network 105 using a device 110 having a category of $cat_1$ would be $P_{cat1}=1/3$. Further, the probability of user 100 connecting to network 105 using a device 110 having a category of $cat_2$ would be $P_{cat2}=2/3$, and the probability of user 100 connecting to network 105 using a device 110 having a category of $cat_3$ would be $P_{cat3}=0/3=0$. One exemplary implementation of the generation of profiling vectors is described below with respect to FIGS. 10A and 10B.

Profiling server 210 next creates user groups based on the generated profiling vectors of the users 100 (block 930). Profiling server 210 obtains the profiling vectors for each user 100 generated in block 920 and uses a clustering technique to create user groups having identified centroids (i.e., cluster centers) for each user group. In one implementation, profiling server 210 may apply a K-means clustering algorithm to the profiling vectors of the users 100 to create the user groups with identified centroids. One exemplary implementation of the creation of user groups, using K-means clustering and the profiling vectors generated in block 920, is described in further detail below with respect to FIG. 11.

Profiling server 210 determines particular users for/with whom to perform certain actions or activities based on those users' affinity with certain ones of the created user groups (block 940). Profiling server 210 may identify one or more user groups that are associated with the future performance of an action or activity. For example, one or more particular user groups may be identified as being affected by a certain firmware upgrade. As another example, one or more user groups may be determined to likely suffer a network service disruption. Profiling server 210 may additionally determine affinity scores for each user 100, and then use those affinity scores for determining an affinity each user 100 has with the identified user group(s). Profiling server 210 may identify particular users 100, having affinity scores indicating an affinity with the identified user group(s), as being targets for the certain actions or activities. One exemplary implementation of the determination of users for/with whom to perform certain actions or activities is described in further detail below with respect to FIGS. 14 and 15.

Figure 10A:
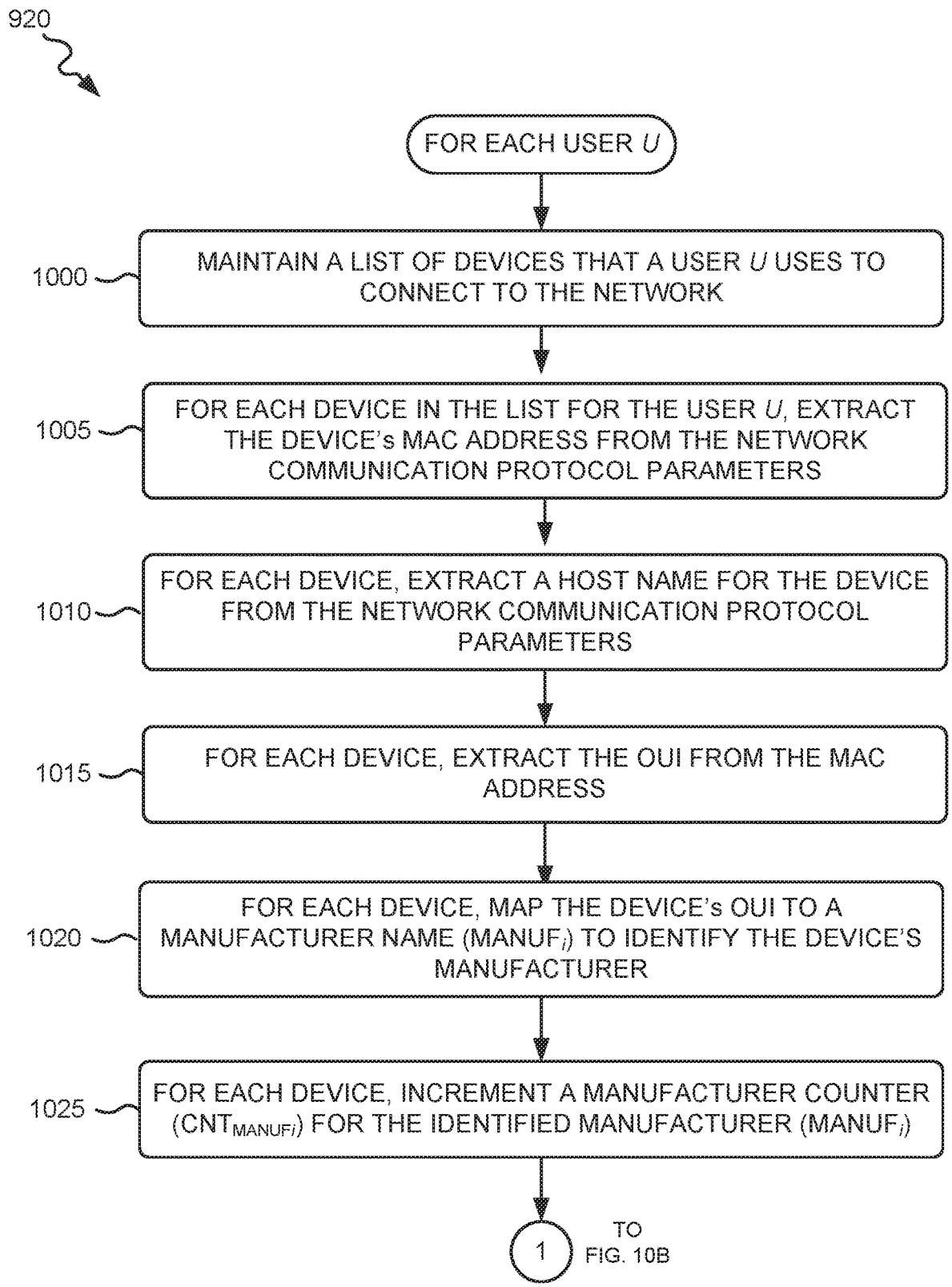
FIGS. 10A and 10B are flow diagrams that illustrate one exemplary implementation of the generation of profiling vectors of the process of FIG. 9.
Figure 10B:
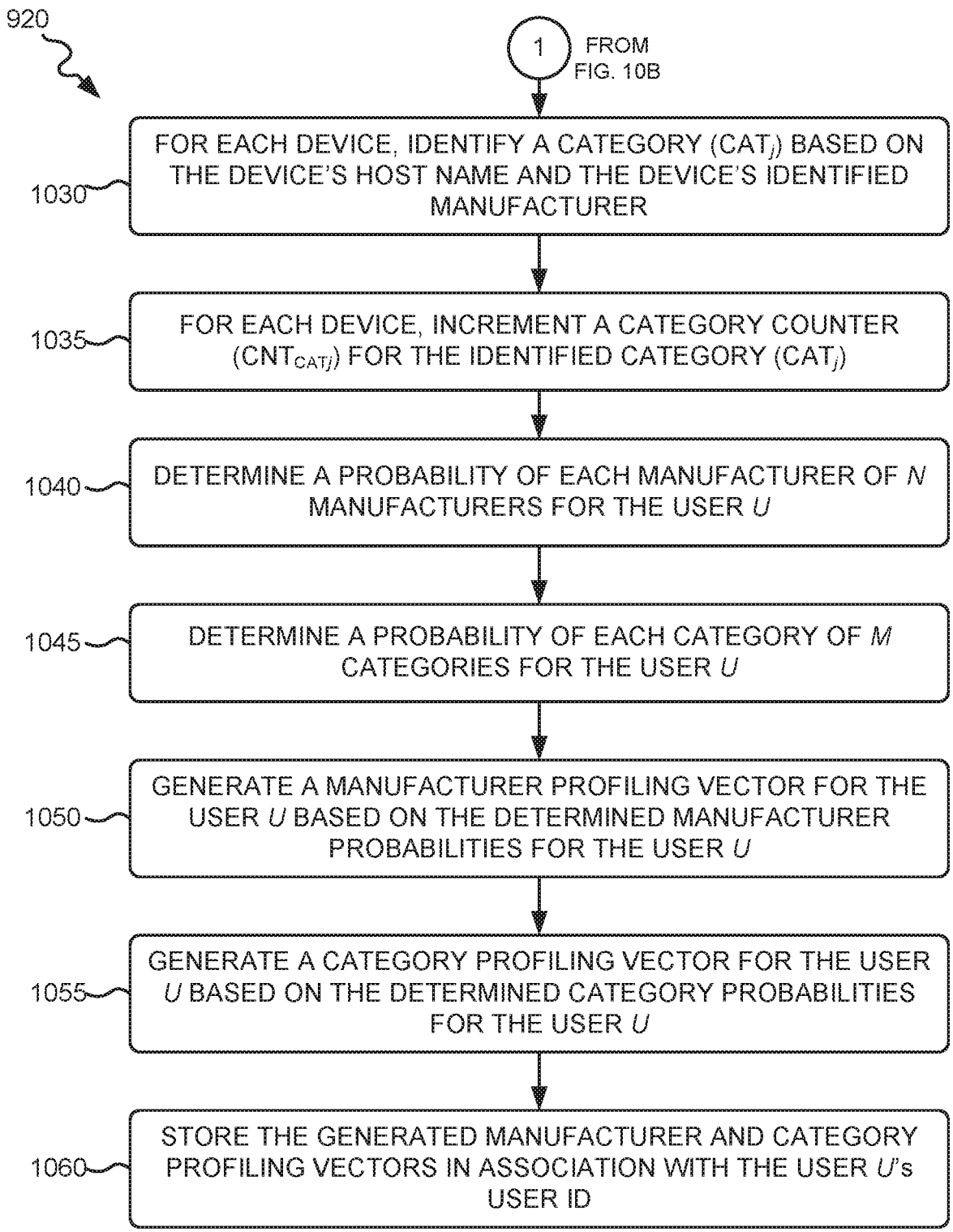

FIGS. 10A and 10B are flow diagrams that illustrate one exemplary implementation of block 920 of the exemplary process of FIG. 9. The exemplary process of FIGS. 10A and 10B may be implemented by profiling server 210. The exemplary process of FIGS. 10A and 10B may be executed for each user U of users 100 that connects to service provider's network 105 via one or more devices 110. The process of FIGS. 10A and 10B may, therefore, be executed in parallel for each user U of multiple users 100 that connects to network 105 via devices 110.

The exemplary process includes profiling server 210 maintaining a list of devices that a user U uses to connect to the network 105 (block 1000). As a user U 100 connects to network 105, via an access device 113 using a user device 110, one or more network communication protocol parameters (e.g., TR-069 parameters) associated with the device 110 are provided to profiling server 210 for storage in a list associated with the user 100. The device list may be associated with a unique user ID for the user U 100 and may store the network communication protocol parameters for each device 110 used by the user U 100 for accessing network 105. Profiling server 210 may receive the network communication protocol parameters for each connected device 110 from the access device 113 used to connect to network 105, or from another component (e.g., a network device performing network administrative functions) of network 105.

For each device 110 in the list for the user U, profiling server 210 extracts the device's MAC address from the obtained network communication protocol parameters (block 1005), and further extracts a host name for the device 110 from the network communication protocol parameters (block 1010). In implementations in which TR-069 is the network communication protocol associated with connection establishment between a device 110 and network 105, various TR-069 parameters may be obtained during establishment of the user device connection including, for example, an Internet Protocol (IP) address of device 110, a MAC address of device 110, and/or a host name of device 110. Profiling server 210 retrieves the MAC address and the host name for each device 110 for the user U from the maintained list.

For each device, profiling server 210 extracts the Organizational Unique Identifier (OUI) from the MAC address (block 1015) and maps the device's OUI to a manufacturer name ($MANUF_i$) to identify the device's manufacturer (block 1020). The first three pairs of alphanumeric characters in the MAC address represent the OUI of the device 110. The OUI indicates a specific manufacturer for the device 110. Profiling server 210 may store a data structure, such as a table, that maps each known OUI to its corresponding manufacturer's name. Profiling server 210 may, therefore, perform a lookup into the OUI data structure and map the OUI of the device 110's MAC address to the name of device 110's manufacturer.

For each device, profiling server 210 increments a manufacturer counter ($CNT_{MANUFi}$) for the identified manufacturer ($MANUF_i$) (block 1025). For each user U, profiling server 210 may maintain a counter value for each manufacturer ($MANUF_i$). For each manufacturer identified in block 1020 for user U, the counter value $CNT_{MANUFi}$ for that manufacturer is incremented. Profiling server 210, thus, maintains a set of i counter values for i manufacturers for each user U.

For each device, profiling server 210 identifies a category ($CAT_j$) based on the device's host name and the device's identified manufacturer (block 1030). A known range of device host names and manufacturer names may be associated with a particular category(ies) of devices. For example, if a host name for a device 110 is "Gamebox" and the manufacturer is "Sony™," then the device 110 can be predicted to be a "Playstation™," and the "category" is a "gaming console." For each device, profiling server 210 increments a counter ($CNT_{CATj}$) for the identified category $CAT$, (block 1035). For each user U, profiling server 210 may maintain a counter value for each device category ($CAT_j$). For each category of device 110 identified in block 1030 for user U, the counter value $CNT_{CATj}$ for that category is incremented. Profiling server 210, thus, maintains a set of j counter values for j categories for each user U.

Profiling server 210 determines a probability of each manufacturer of N manufacturers for the user U (block 1040). In one implementation, profiling server 210 may determine a probability of each manufacturer ($MANUF_i$) for the user U using the following:

$$P(MANUF_i) = CNT_{MANUFi} \Big/ \sum_j CNT_{MANUFj} \qquad \text{Eqn. (1)}$$

where j is equal to all j manufacturers from 1 to j. Therefore, for each user and for a particular manufacturer i, the probability of that manufacturer i is equal to the counter value for that user for that manufacturer i divided by the sum of the counter values for all of the j manufacturers for that user. In a simplified example, if it is determined that a user U connected to network 105 with 5 devices total, and 2 of the devices are Apple™ devices, 1 of the devices is an Amazon™ device, and 1 of the devices is a Samsung™ device, then the $P_{Apple}$=2/5, the $P_{Amazon}$=1/5, and the $P_{Samsung}$=1/5.

Profiling server 210 determines a probability of each category of M categories for the user U (block 1045). In one implementation, profiling server 210 may determine a probability of each category ($CAT_i$) for the user U using the following:

$$P(CAT_i) = CNT_{CATi} \Big/ \sum_j CNT_{CATj} \qquad \text{Eqn. (2)}$$

where j is equal to all j categories from 1 to j. Therefore, for each user and for a particular category i, the probability of that category i is equal to the counter value for that user for that category i divided by the sum of the counter values for all of the j categories for that user. In a simplified example, if it is determined that a user U connected to network 105 with 5 devices total, and 1 of the devices is a gaming console, 2 of the devices are PCs, 1 of the devices is a TV, and 1 of the devices is a phone, then the $P_{gaming\ console}$=1/5, $P_{PC}$=2/5, $P_{TV}$=1/5, and $P_{phone}$=1/5.

Profiling server 210 generates a manufacturer profiling vector for the user U based on the determined probabilities for the user U (block 1050). Given the probabilities of N manufacturers for the user U determined in block 1040, profiling server 210 generates a manufacturer profiling vector: [$P_{MANUF1}$, $P_{MANUF2}$, ..., $P_{MANUFN}$]. Returning to the simplified example of block 1040, if a user U connected to network 105 with 5 devices total, with 2 of the devices being Apple™ devices, 1 of the devices being an Amazon™ device, and 1 of the devices being a Samsung™ device, then the $P_{Apple}$=2/5, the $P_{Amazon}$=1/5, and the $P_{Samsung}$=1/5, and the manufacturer profiling vector [$P_{Apple}$ $P_{Amazon}$ $P_{Samsung}$] would equal [2/5 1/5 1/5].

Profiling server 210 generates a category profiling vector for the user U based on the determined category probabilities for the user U (block 1055). Given the probabilities of M manufacturers for the user U determined in block 1045, profiling server 210 generates a category profiling vector: [$P_{CAT1}$, $P_{CAT2}$, ..., $P_{CATM}$]. Returning to the simplified example of block 1045, if a user U connected to network 105 with 5 devices total, with 1 of the devices being a gaming console, 2 of the devices being PCs, 1 of the devices being a TV, and 1 of the devices being a phone, then the $P_{gaming\ console}$=1/5, $P_{PC}$=2/5, $P_{TV}$=1/5, and $P_{phone}$=1/5, and the category profiling vector [$P_{gaming\ console}$ $P_{PC}$ $P_{TV}$ $P_{phone}$] would equal [1/5 2/5 1/5 1/5].

Profiling server 210 stores the generated manufacturer and category profiling vectors in association with the user U's user ID (block 1060). For example, profiling server 215 stores the user U's user ID in a field 610 of an entry 600 of profiling vector DB 225, and stores the manufacturer profiling vector generated for the user U in block 1050 in field 620 of the same entry 600 and the category profiling vector generated for the user U in block 1055 in field 630 of the same entry 600. Additionally, profiling server 210 may obtain a current time stamp (e.g., date and/or time) and store the time stamp in field 640 of the entry 600 to identify a time at which the profiling vectors were generated. The profiling vectors stored in profiling vector DB 225 may be subsequently used in user group clustering, and user affinity scoring for each user group (described in further detail below).

Figure 11:
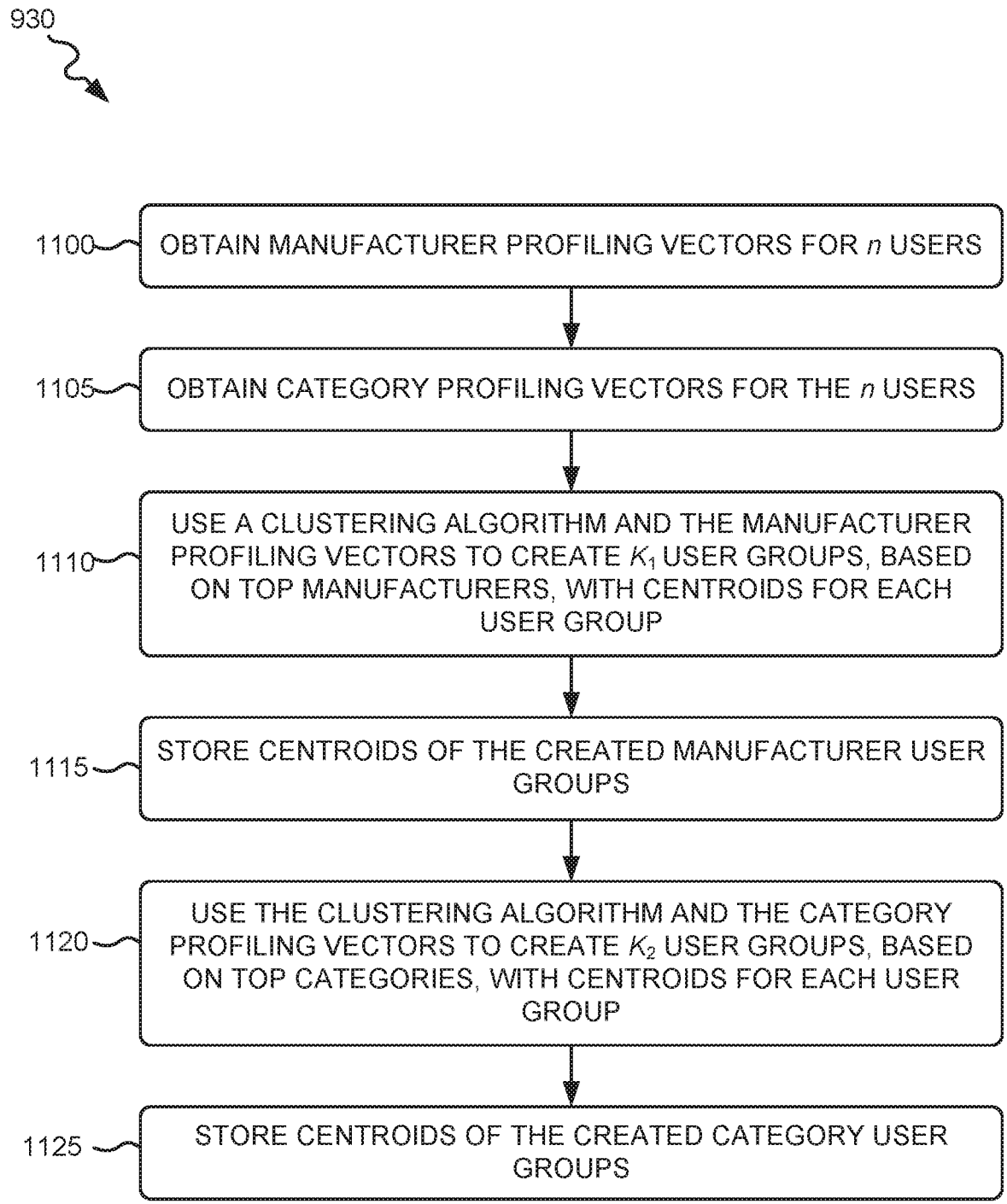
FIG. 11 is a flow diagram that illustrates one exemplary implementation of the creation of user groups of the process of FIG. 9.

FIG. 11 is a flow diagram that illustrates one exemplary implementation of block 930 of the exemplary process of FIG. 9. The exemplary process of FIG. 11 may be implemented by profiling server 210. The process of FIG. 11 may be executed subsequent to the process of FIGS. 10A and 10B.

The exemplary process includes profiling server 210 obtaining manufacturer profiling vectors for n users (block 1100) and also obtaining category profiling vectors for the n users (block 1105). The n users may include a set of all users that have accessed network 105 over a span of time, or only a sub-set of all of the users that have accessed network 105 over the span of time. For each of the n users, profiling server 210 retrieves a manufacturer profiling vector stored in field 620, and a category profiling vector stored in field 630, of each entry 600 that corresponds to one of the n users.

Profiling server 210 uses a clustering algorithm and the manufacturer profiling vectors to create $K_1$ user groups, based on top manufacturers, with centroids for each user group (block 1110). The clustering algorithm, partitions n observations (i.e., n manufacturer profiling vectors) into $K_1$ clusters in which each observation belongs to a cluster of the $K_1$ clusters having the nearest mean. Completion of the clustering algorithm generates $K_1$ cluster centers (centroids) that correspond to $K_1$ manufacturer user groups. The $K_1$ manufacturer user groups created by the clustering algorithm may include the complete set of manufacturers, or may only include a top number (e.g., the most common) of manufacturers among all of the manufacturers. In one implementation, the clustering algorithm may include the K-means clustering algorithm, and the centroids for each manufacturer user group may include data that identifies the cluster centers of each manufacturer user group. One exemplary implementation of the user group clustering, based on user manufacturer profiling vectors, of block 1110 is described in further detail below with respect to FIG. 12.

Profiling server 210 stores the centroids of the manufacturer user groups (block 1115). For each cluster center created in block 1110, profiling server 210 generates a unique group ID, and stores the group ID in a field 710, and the centroids of the manufacturer user groups in a field 720, of a particular entry 700 of user group DB 230.

Profiling server 210 uses the clustering algorithm and the category profiling vectors to create $K_2$ user groups, based on top categories, with centroids for each user group (block 1120). The clustering algorithm, partitions n observations (i.e., n category profiling vectors) into $K_2$ clusters in which each observation belongs to a cluster of the $K_2$ clusters having the nearest mean. Completion of the clustering algorithm generates $K_2$ cluster centers (centroids) that correspond to $K_2$ category user groups. The $K_2$ category user groups created by the clustering algorithm may include the complete set of categories, or may only include a top number (e.g., the most common) of categories among all of the categories. In one implementation, the clustering algorithm may include the K-means clustering algorithm, and the centroids for each category user group may include data that identifies the cluster center of each category user group. One exemplary implementation of the user group clustering, based on user category profiling vectors, of block 1120 is described in further detail below with respect to FIG. 13.

Profiling server 210 stores centroids of the category user groups (block 1125). For each cluster center created in block 1120, profiling server 210 generates a unique group ID, and stores the group ID in a field 710, and the centroids of the category user groups in a field 720, of a particular entry 700 of user group DB 230.

Figure 12:
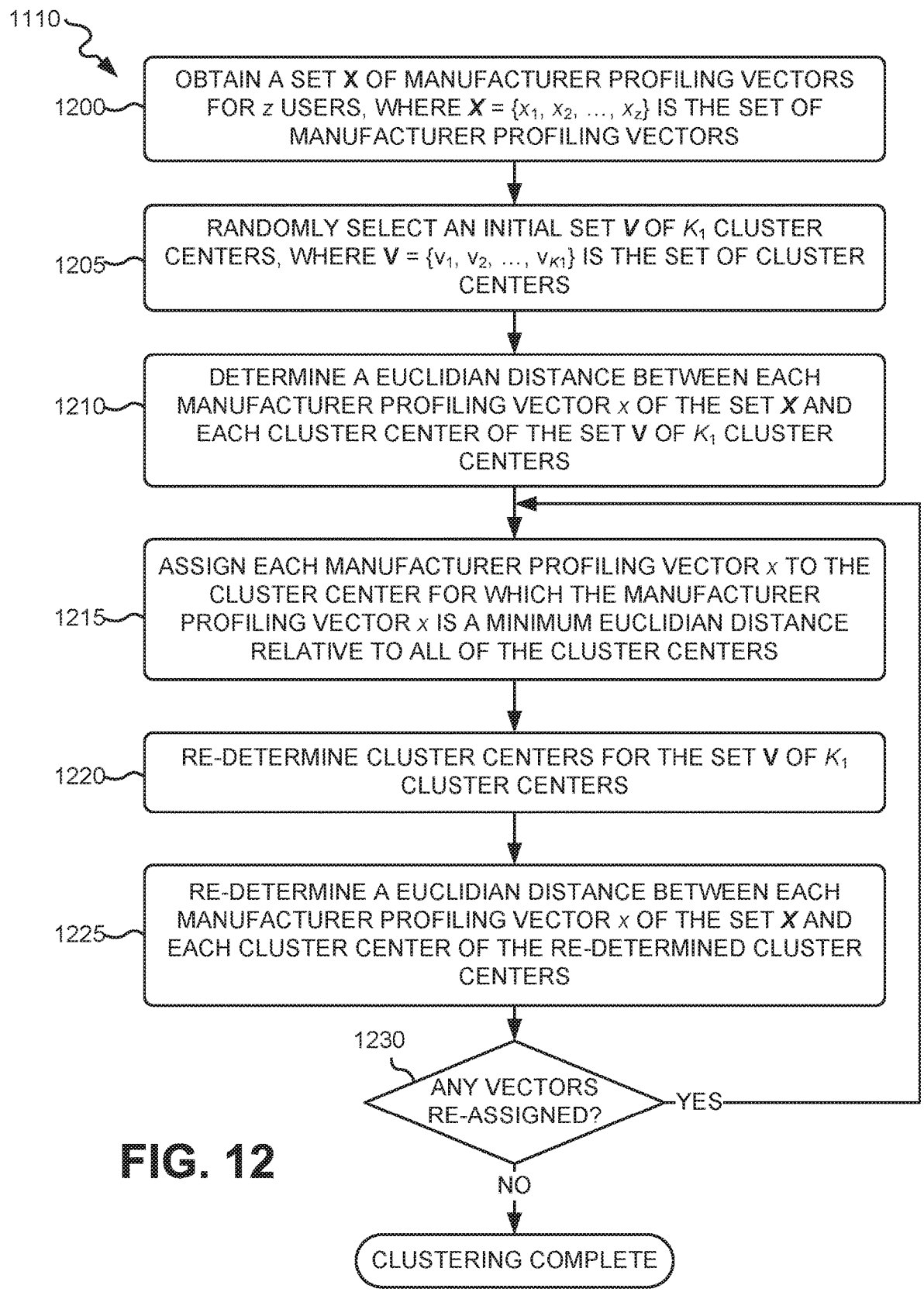
FIG. 12 is a flow diagram that illustrates one exemplary implementation of the creation of $K_1$ manufacturer user groups of the process of FIG. 11.

FIG. 12 is a flow diagram that illustrates one exemplary implementation of block 1110 of the exemplary process of FIG. 11. The exemplary process of FIG. 12 may be implemented by profiling server 210.

The exemplary process includes profiling server 210 obtaining a set X of manufacturer profiling vectors x for z users, where $X=\{x_1, x_2, \ldots, x_z\}$ is the set of manufacturer profiling vectors (block 1200). The z users may include all of the users that have connected to the network 105 using one or more devices 110 or may include some subset of all of the users that have connected to the network 105. In a simplified example, if z equals two users, and $user_1$ has a manufacturer profiling vector $x_1=[P_{MANUF1}^{USER1}, P_{MANUF2}^{USER1} \ldots P_{MANUFp}^{USER1}]$ and $user_2$ has a manufacturer profiling vector $x_2=[P_{MANUF1}^{USER2}, P_{MANUF2}^{USER2} \ldots P_{MANUFp}^{USER2}]$, then the set X of manufacturer profiling vectors would include $\{x_1, x_2\}$.

Profiling server 210 randomly selects an initial set V of $K_1$ cluster centers, where $V=\{v_1, v_2, \ldots, v_{K1}\}$ is the set of cluster centers (block 1205). $K_1$ points in the n-dimensional profiling vector space may be randomly selected, where n is equal to the total number of manufacturers, $v_1=(P_{MANUF1}, P_{MANUF2}, \ldots, P_{MANUFn})$ and where each $v_i$'s values for $P_{MANUF1}, P_{MANUF2}, \ldots, P_{MANUFn}$ are the randomly selected points. In some implementations, the value for $K_1$ may equal the number of top manufacturers (e.g., 5 top manufacturers out of a total number of 20) and may represent the number of manufacturer user groups to be generated by the clustering algorithm.

Profiling server 210 determines a Euclidian distance between each manufacturer profiling vector x of the set X and each cluster center of the set V of $K_1$ cluster centers (block 1210). The Euclidian distance d(p,q) between n-dimensional points p and q may be determined using the following:

$$d(p,q)=((p_1-q_1)^2+(p_2-q_2)^2+ \ldots +(p_n-q_n)^2)^{1/2} \qquad \text{Eqn. (3)}$$

In one example, a first manufacturer profiling vector $x_i$ of the set X equals the following: $x_1=[P_1^{prof} P_2^{prof} \ldots P_n^{prof}]$, and a first cluster center $v_1$ of the $K_1$ cluster centers of the set V equals the following: $v_1=(P_1^{clust}, P_2^{clust}, \ldots, P_n^{clust}$. The Euclidian distance $d(x_1,v_1)$ between manufacturer profiling vector $x_1$ and cluster center $v_1$ equals the following:

$$d(x_1,v_1)=(P_1^{prof}-P_1^{clust})^2+(P_2^{prof}-P_2^{clust})^2+ \ldots + (P_n^{prof}-P_n^{clust})^2)^{1/2} \qquad \text{Eqn. (4)}$$

Profiling server 210 assigns each manufacturer profiling vector x to the cluster center for which the manufacturer profiling vector x is a minimum Euclidian distance relative to all of the cluster centers (block 1215). For example, if manufacturer profiling vector $x_1$ is determined to have the minimum Euclidian distance (determined using Eqn. (3) of block 1210) with cluster center $v_3$, among cluster centers $v_1$ through $v_{K1}$, then profiling server 210 assigns profiling vector $x_1$ to cluster center $v_3$. Profiling server 210 repeats this assignment process for each of the n profiling vectors.

Profiling server 210 re-determines cluster centers for the set V of $K_1$ cluster centers (block 1220). Profiling server 210 may re-determine the cluster centers using the following:

$$v_i = \frac{1}{c_i}\sum_{j=1}^{c_i} x_i \qquad \text{Eqn. (5)}$$

where $c_i$ represents the quantity of manufacturer profiling vectors $x_i$ currently assigned to the $i^{th}$ cluster center. Profiling server 210 re-determines a Euclidian distance between each manufacturer profiling vector x of the set X and each cluster center of the re-determined cluster centers (block 1225). Profiling server 210 repeats the determination of block 1210, with the set V of $K_1$ cluster centers including the re-determined cluster centers of the most recent iteration of block 1220, instead of the previously determined cluster centers (i.e., from block 1205, or from the previous iteration of block 1220).

Profiling server 210 determines if any of the manufacturer profiling vectors have been re-assigned, in the most recent iteration of block 1215, to a different cluster center (block 1230). If at least one of the manufacturer profiling vectors has been re-assigned to a different cluster center (YES—block 1230), then the process returns to block 1215 with re-assignment of each manufacturer profiling vector x to a cluster center (of the re-determined cluster centers of block 1220) for which the profiling vector x is a minimum Euclidian distance relative to all of the re-determined cluster centers. If no manufacturer profiling vectors have been re-assigned to a different cluster center (NO—block 1230), then the category user group clustering is complete, and the resulting re-determined cluster centers (i.e., centroids) of block 1220 each represent a respective manufacturer user group of the $K_1$ manufacturer user groups.

Figure 13:
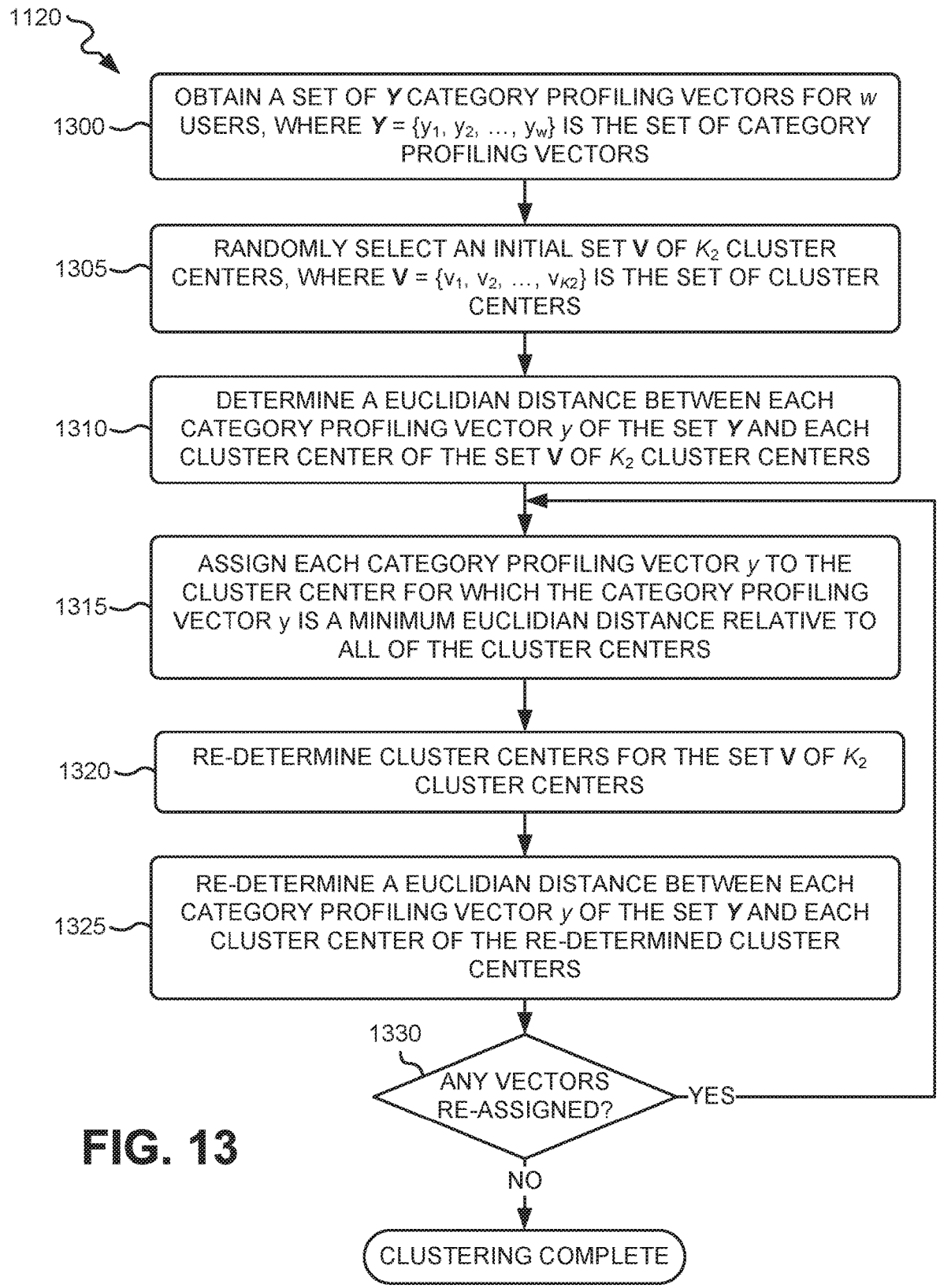
FIG. 13 is a flow diagram that illustrates one exemplary implementation of the creation of $K_2$ category user groups of the process of FIG. 11.

FIG. 13 is a flow diagram that illustrates one exemplary implementation of block 1120 of the exemplary process of FIG. 11. The exemplary process of FIG. 13 may be implemented by profiling server 210.

The exemplary process includes profiling server 210 obtaining a set Y of category profiling vectors for w users, where Y={$y_1, y_2, \ldots, y_w$} is the set of category profiling vectors (block 1300). The w users may include all of the users that have connected to the network 105 using one or more devices 110, or the w users may include some subset of all of the users that have connected to the network 105. In a simplified example, if w equals three users, and user$_1$ has a category profiling vector $y_1=[P_{CAT1}^{USER1} \ldots P_{CAT2}^{USER1} \ldots P_{CATp}^{USER1}]$, user$_2$ has a category profiling vector $y_2=[P_{CAT1}^{USER2} \ldots P_{CAT2}^{USER2} \ldots P_{CATp}^{USER2}]$, and user$_3$ has a category profiling vector $y_3=[P_{CAT1}^{USER3} \ldots P_{CAT2}^{USER3} \ldots P_{CATp}^{USER3}]$, then the set Y of category profiling vectors would include {$y_1, y_2, y_3$}.

Profiling server 215 randomly selects a set V of $K_2$ cluster centers, where V={$v_1, v_2, \ldots, v_{K2}$} is the set of cluster centers (block 1305). $K_2$ points in the n-dimensional profiling vector space may be randomly selected, where n is equal to the total number of categories, $v_i=(P_{CAT1}, P_{CAT2}, \ldots, P_{CATn})$, and where each $v_i$'s values for $P_{CAT1}, P_{CAT2}, \ldots, P_{CATn}$ are the randomly selected points. In some implementations, the value for $K_2$ may equal to the number of top categories (e.g., 10 top categories out of a total number of 30) and may represent the number of category user groups to be generated by the clustering algorithm.

Profiling server 210 determines a Euclidian distance between each category profiling vector y of the set Y and each cluster center of the set V of $K_1$ cluster centers (block 1310). The Euclidian distance d(p,q) between n-dimensional points p and q may be determined using Eqn. (3) above. In one example, a first category profiling vector $y_1$ of the set Y equals the following: $y_1=[P_1^{prof} P_2^{prof} \ldots P_n^{prof}]$ and a first cluster center $v_1$ of the $K_2$ cluster centers of the set V equals the following: $v_1=(P_1^{clust}, P_2^{clust}, \ldots, P_n^{clust})$. The Euclidian distance $d(x_1,v_1)$ between category profiling vector $y_1$ and cluster center $v_1$ may be determined using the following:

$$d(y_1,v_1)=(P_1^{prof}-P_1^{clust})^2+(P_2^{prof}-P_2^{clust})^2+\ldots+(P_n^{prof}-P_n^{clust})^2)^{1/2} \qquad \text{Eqn. (6)}$$

Profiling server 210 assigns each manufacturer profiling vector y to the cluster center for which the category profiling vector y is a minimum Euclidian distance relative to all of the cluster centers (block 1315). For example, if category profiling vector $y_1$ is determined to have the minimum Euclidian distance (determined using Eqn. (1) of block 1310) with cluster center $v_3$, among cluster centers $v_1$ through $v_{K2}$, then profiling server 210 assigns profiling vector $y_1$ to cluster center $v_3$. Profiling server 210 repeats this assignment process for each of the n profiling vectors.

Profiling server 210 re-determines cluster centers for the set V of $K_2$ cluster centers (block 1320). Profiling server 210 may re-determine the cluster centers using the following:

$$v_i = \frac{1}{c_i}\sum_{j=1}^{c_i} y_i \qquad \text{Eqn. (7)}$$

where $c_i$ represents the quantity of category profiling vectors $y_i$ currently assigned to the $i^{th}$ cluster center. Profiling server 210 re-determines a Euclidian distance between each category profiling vector y of the set Y and each cluster center of the re-determined cluster centers (block 1325). Profiling server 210 repeats the determination of block 1310, with the set V of $K_2$ cluster centers including the re-determined cluster centers of the most recent iteration of block 1320, instead of the previously determined cluster centers (i.e., from block 1305, or from the previous iteration of block 1320).

Profiling server 210 determines if any of the category profiling vectors have been re-assigned, in the most recent iteration of block 1315, to a different cluster center (block 1330). If at least one of the category profiling vectors has been re-assigned to a different cluster center (YES—block 1330), then the process returns to block 1315 with re-assignment of each category profiling vector y to a cluster center (of the re-determined cluster centers of block 1320) for which the profiling vector y is a minimum Euclidian distance relative to all of the re-determined cluster centers. If no category profiling vectors have been re-assigned to a different cluster center (NO—block 1330), then the category user group clustering is complete, and the resulting re-determined cluster centers (i.e., centroids) of block 1320 each represent a respective category user group of the $K_2$ category user groups.

Figure 14:
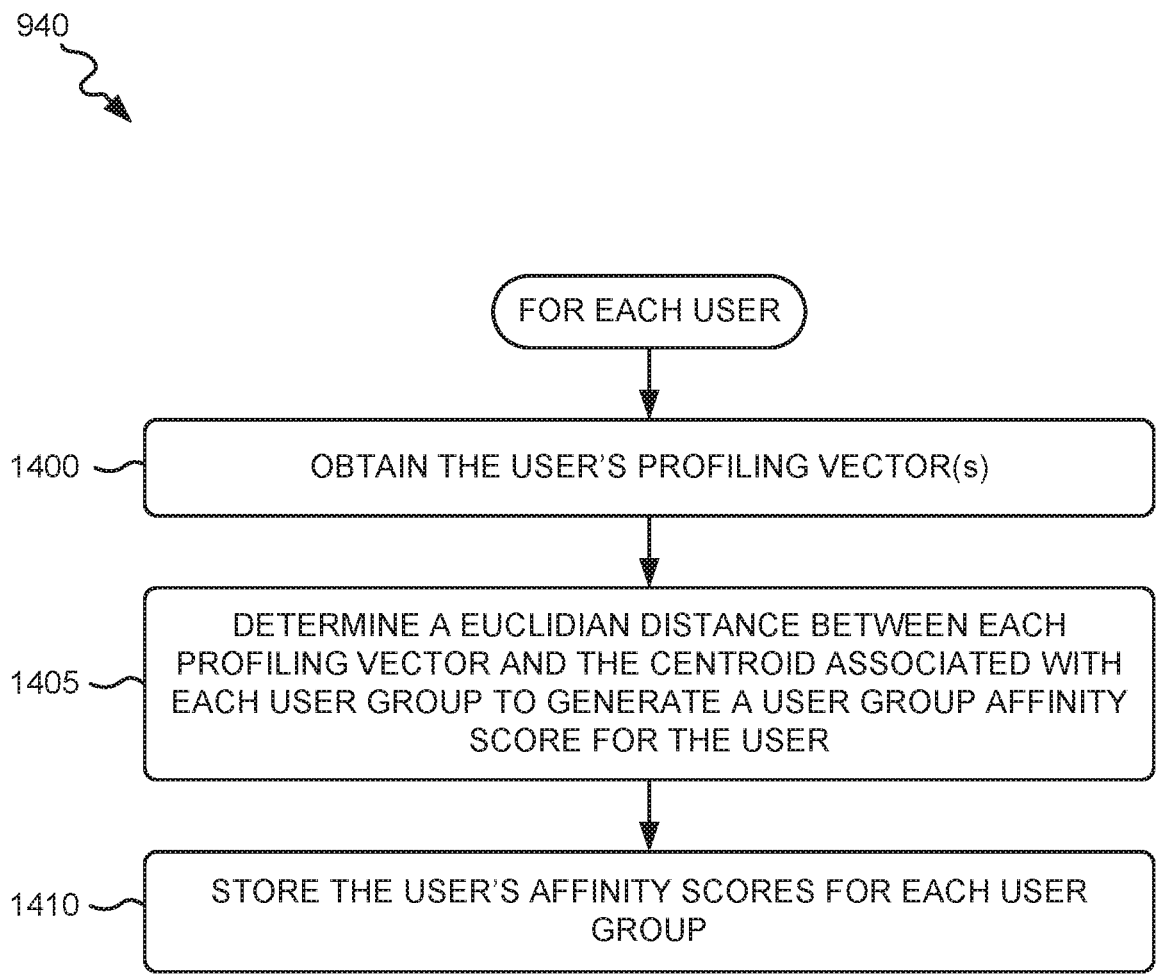
FIG. 14 is a flow diagram that illustrates a first portion of one exemplary implementation of the determination of particular users for/with whom to perform certain actions or activities of the process of FIG. 9.

FIG. 14 is a flow diagram that illustrates a first portion of one exemplary implementation of block 940 of the exemplary process of FIG. 9. The exemplary process of FIG. 14 may be implemented by profiling server 210. The exemplary process of FIG. 14 may be executed for each user U of users 100 that connects to network 105 using one or more devices 110. The process of FIG. 14 may, therefore, be executed independently (e.g., in parallel) for each user U of multiple users 100 that connects to network 105 using devices 110.

The exemplary process includes profiling server 210 obtaining the user's profiling vector(s) (block 1400). Profiling server 210 may use the user's unique user ID to query profiling vector DB 225 and retrieve the user's manufacturer profiling vector from field 620, and the user's category profiling vector, from an entry 600 of DB 225 having a matching user ID in field 610.

Profiling server 210 determines a Euclidian distance between each profiling vector and a centroid associated with each user group to generate a user group affinity score for the user (block 1405). Eqn. (3) may be used to determine the Euclidian distance between a profiling vector and a centroid associated with each user group. In one example, a retrieved manufacturer profiling vector equals the following: [$P_1^{prof} P_2^{prof} \ldots P_n^{prof}$], and a centroid associated with a first manufacturer user group of $K_1$ user groups equals the following: ($P_1^{clust} P_2^{clust}, \ldots, P_n^{clust}$). The Euclidian distance d between the manufacturer profiling vector and each centroid equals the following:

$$d=((P_1^{prof}-P_1^{clust})^2+(P_2^{prof}-P_2^{clust})^2+\ldots+(P_n^{prof}-P_n^{clust})^2)^{1/2} \qquad \text{Eqn. (8)}$$

The calculation of Eqn. (8) may be repeated for each centroid of the $K_1$ manufacturer user groups to determine the Euclidian distance d between the manufacturer profiling vector and each centroid of $K_1$ centroids. The determined distance d between the manufacturer profiling vector and a centroid of the $K_1$ centroids represents an affinity score that indicates an affinity between the user 100 and the particular manufacturer user group associated with the centroid. The calculation of Eqn. (8) may be similarly repeated for each centroid of the $K_2$ category user groups to determine the Euclidian distance d between the user 100's retrieved category profiling vector and each centroid of the $K_2$ centroids. The determined distance d between the category profiling vector and a centroid of the $K_2$ centroids represents an affinity score that indicates an affinity between the user 100 and the particular category user group associated with the centroid.

Profiling server 210 stores the user's affinity scores for each user group (block 1410). Profiling server 210 may store the user 100's unique user ID in field 810 of an identified entry 800 of affinity score DB 235, and then may store each user group affinity score, determined in block 1405), in one of fields 820-1 through 820-k. In one implementation, $k=K_1+K_2$. Therefore, the affinity scores for each of the manufacturer user groups Manuf_User_Group_1 through Manuf_User_Group_$K_1$ may be stored in fields 820-1 through 820-$K_1$, and the affinity scores for each of the category user groups Cat_User_Group_1 through Cat-User-_Group_$K_2$ may be stored in fields 820-$K_1$+1 through 820-k. The stored affinity scores may be subsequently retrieved and used for determining users 100 affinities with particular user groups, such as described below with respect to FIG. 15.

Figure 15:
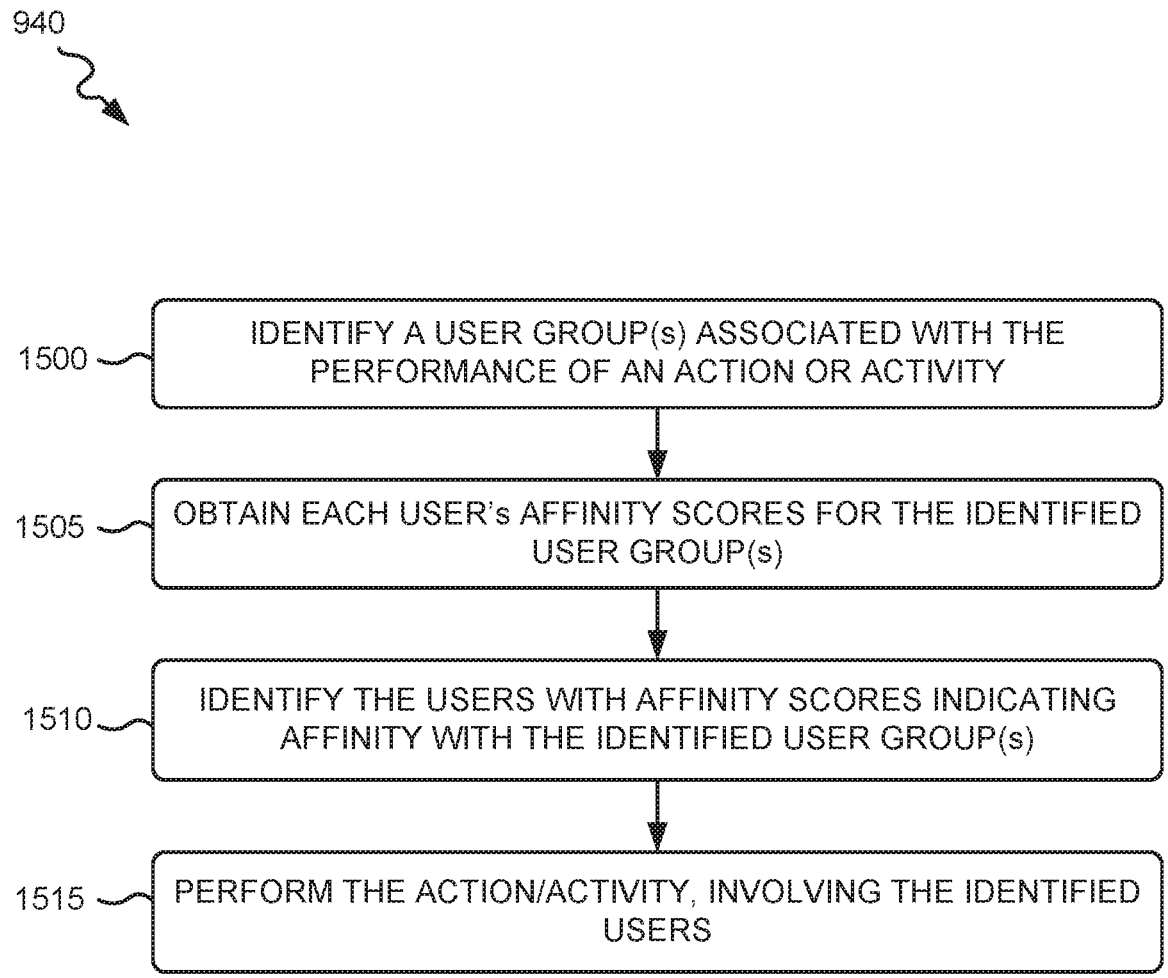
FIG. 15 is a flow diagram that illustrates a second portion of one exemplary implementation of the determination of particular users for/with whom to perform certain actions or activities of the process of FIG. 9.

FIG. 15 is a flow diagram that illustrates a second portion of one exemplary implementation of block 940 of the exemplary process of FIG. 9. The exemplary process of FIG. 15 may, in one implementation, be executed in its entirety by profiling server 210, or by one or more other network devices that are different than profiling server 210. In another implementation, blocks 1500-1515 may be executed by profiling server 210, while block 1515 may be executed by a different network device(s) based on receipt of the user identification information of block 1510 from profiling server 210.

The exemplary process includes profiling server 210 identifying a user group(s) associated with the performance of an action or an activity (block 1500). Certain actions or activities (described above) may be targeted to one or more particular user groups. Profiling server 210 identifies the one or more user groups to which the performance of an action or activity is to be targeted.

Profiling server 210 obtains each user's affinity scores for the identified user group(s) (block 1505). Profiling server 210 retrieves an affinity score(s) stored in a field(s) 820 of affinity score DB 235 that corresponds to the identified user group(s). For example, if manufacturer user groups Manuf_User_Group_1 and Manuf_User_Group_2 are identified as being the targets of certain actions or activities, then their corresponding affinity scores may be retrieved, for each user 100, from fields 820-1 and 820-2 of entries 800 of affinity score DB 235.

Profiling server 210 identifies the users 100 with affinity scores indicating affinity with the identified user group(s) (block 1510). Profiling server 210 may, for example, compare the affinity scores of the entire set of users, and identify a certain percentage of the top scoring users (e.g., the top 10% of the affinity scores). As another example, profiling server 210 may compare each affinity score for each user 100 against a pre-determined threshold affinity score and may identify every one of the users 100 having an affinity score for the particular user group that equals or exceeds the threshold affinity score. The users 100 identified as having an affinity with the particular user group(s) may be stored as an affinity set for the user group(s).

Profiling server 210, or another server or network device (s), performs the action(s) or activity(ies), involving the identified users (block 1515). Various different actions or activities may be targeted towards specific user groups, and to particular users 100 determined to have affinity with those specific user groups. Those actions or activities may include, but are not limited to, the following: 1) targeting software or firmware upgrades, or software patches, to particular users that have an affinity with a particular user group due to the particular types of devices that the users operate to connect to the network; 2) targeting notifications and/or firmware/software upgrades to particular users that have an affinity with a particular user group(s) that is associated with an occurrence of a network security event, or associated with a known network security vulnerability or risk; 3) targeting notifications to users that have an affinity with a particular user group associated with a likely network service disruption; 4) determining user groups that a particular user has affinities with, analyzing network-related issues resolved with respect to other users in the determined user groups, and providing recommendations to the user regarding remedial measures that were taken to resolve the network-related issues for the other users in the determined user groups; and/or 5) targeting ad campaigns, network service upgrades, and/or device upgrades to particular users based on those users' affinities with one or more user groups.

In a first implementation, the actions or activities that are targeted towards a specific user group(s) may include targeting software or firmware upgrades, or software patches, towards devices of particular users having affinity with the specific user group(s). For example, a network provider may release a firmware upgrade to routers within the provider's network, and the firmware upgrade to the routers is then determined to cause connection issues for certain network users. Analysis of the issue demonstrates that a user group associated with a certain device manufacturer (e.g., devices manufactured by XYZ company) or with a certain category of devices (e.g., tablet devices) is primarily affected among multiple user groups. Instead of pushing a software patch to all network devices to either temporarily or permanently fix the connection issues, the software patch may be pushed only to those users who fall within the primarily affected user group. For example, the software patch may be pushed to those users having a highest affinity score (e.g., the highest 20% of affinity scores) for the primarily affected user group. To push the software patch to the users, the users have the highest affinity score for the primarily affected user group may be notified of the software patch via a preferred communication channel (e.g., text, email, or instant message), and the communication may include a link, selection of which initiates installation of the software patch.

In another implementation, the actions or activities that are targeted towards a specific user group(s) may include targeting notifications and/or firmware/software upgrades to particular users that have an affinity with a particular user group(s) that is associated with an occurrence of a network security event, or associated with a known network security vulnerability or risk. For example, a network provider (e.g., Verizon) may become aware of a security vulnerability that impacts the devices of a specific vendor (e.g., a particular IoT security camera manufactured by PDQ company). The security vulnerability of the particular vendor device, when the device is used in a particular location, such as at a customer's home network, may place other connected devices in the home network in jeopardy so as to potentially compromise the security of the entire home network. The network provider identifies the security vulnerability, the cause(s) of the security vulnerability, and a remediation measure(s) for the security vulnerability. A user group(s) associated with the particular vendor device (e.g., IoT security camera by PDQ company) is identified, and users are identified having an affinity with the identified user group(s). The network provider then engages in proactive or reactive communications with the identified users to notify the users of the security vulnerability, and to make available any remediation measure(s) for the security vulnerability (e.g., software/firmware upgrade).

For example, in the case of proactive communications, the network provider may initiate communications with the users having affinity with the identified user group(s) via a user-preferred communication channel (e.g., text, email, instant message). In the case of reactive communications, the network provider may wait until a particular user uses one of the provider's digital channels (e.g., visits provider's website, uses provider's app), verifies that the user has affinity with the user group(s) associated with the security event, vulnerability, or risk, and then notifies that user of the security vulnerability or risk and directs the user to any remediation measures (e.g., a link to a software or firmware upgrade). Targeting of users having affinity with particular user groups associated with a security event, vulnerability, or risk avoids the network provider having to broadcast the security threat to all of its customers and enables the surgical targeting of those users most likely affected by the security threat.

In a further implementation, the actions or activities that are targeted towards a specific user group(s) may include targeting notifications and/or software patches to users having affinity with a user group(s) that is associated with a likely network service disruption. For example, a common complaint received by network providers is that one or more of a user's devices cannot connect to, or maintain connectivity with, their home router. Router connection problems can be recurrent with devices from a certain manufacturer and/or a certain device type (e.g., an Android™ smart phone manufactured by XYZ company) such that these devices are not likely to maintain a session with the router. An analysis of this connectivity issue determines that a significant percentage of the complaints come from users in a user group that is associated with the particular type and manufacturer of device (identified by group centroid scores). Users, having an affinity with the identified user group(s), may be targeted for notifications and/or software patches for the service disruption problem. The notifications can be sent to the targeted users through their user-preferred communication channel (e.g., text, email, instant message), and may include, for example, a link to a web page that includes instructions for resolving the issues. Alternatively, a software patch may be pushed to the device(s) of targeted users to correct the connectivity problem.

In yet another implementation, the actions or activities that are targeted towards a specific user group(s) may include the targeting of advertisements for new products or new services towards users having affinity with the specific user group(s). For example, a network service provider may desire to offer one or more upgraded network service plans to particular users. The network service provider may generally offer a range of service plans having varying speeds, download data limits, and bandwidths. In the absence of user profile information, users may be offered, through a mistargeted ad campaign, an upgraded service plan with which they have no interest or which is relevant only to users having a different type of network usage or a different type of user device. For example, a particular ad campaign is intended to target users that engage in heavy bandwidth usage. A particular user has a profile vector(s) that describes the user's inclination towards a certain device manufacturer or a certain category of device. A count of the user's devices that are a certain category (e.g., gaming devices) of device may be obtained. The user currently has a network service subscription that includes a basic connection (e.g., low bandwidth usage). Through the use of affinity scores, the user is determined to have an affinity to a user group that includes gamers (determined by the devices that the users of the group uses to connect to the network). Using this information, the network service provider may recommend higher bandwidth service plans that are currently used by other users within the identified gamer user group. The service plan recommendation may be sent to the particular user via a user-preferred communication channel (text, instant message, email), or may be offered to the user when, for example, the user visits the network service provider's website.

In an additional implementation, the actions or activities that are targeted towards a specific user group(s) may include the targeting of advertisements for new products towards users having affinity with the specific user group(s). Typically, advertisements for new products are generated based on a particular user's purchase history or search history. New products may, however, be targeted to users having affinity with a particular user group(s) based on, for example, a list of the user's connected devices, the devices' manufacturers, and the devices' categories. For example, assume that the creation of user groups based on profiling vectors results in a user group that includes all users having "smart home" devices, such as smart homes, smart TVs, and/or other smart home gadgets (e.g., smart IoT devices). Users having affinity with this "smart home savvy" user group may be identified, and specific new smart home products may be recommended to the identified users. The specific new smart home products that may be recommended may include, for example, bundled offers at a discount rate, such as a combination of a smart camera, a smart doorbell, and a smart light.

As another example of the targeting of new products, users may be identified that have an affinity with a user group(s) associated with a certain manufacturer (e.g., Apple™), and devices manufactured by that manufacturer may be recommended to the identified users, such as a discounted upgrade on a new version of that manufacturer's phone (e.g., an Apple™ phone), or a discounted price on a new device manufactured by that manufacturer (e.g., an Apple™ iPad Pro). The targeted product recommendations/ads may be sent to identified users via their user-preferred communication channel, or presented to them when, for example, the identified users visit the network provider's website.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 9-15, the order of the blocks may be varied in other implementations. Moreover, non-dependent blocks may be performed in parallel. Exemplary embodiments are described herein as creating user groups based on, for example, device manufacturers or device categories. Other parameters associated with users, and their devices, that connect to a network via an access device 113, however, may be used for creating user groups, and certain ones of the created user groups may be used for targeting a particular action or activity towards users having an affinity with those user groups.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining when multiple users each connect to a network using one or more devices;
   obtaining device or network-related parameters associated with the one or more devices;
   generating profiling vectors for each of the multiple users, that connects to the network using the one or more devices, to produce multiple profiling vectors, wherein generating the profiling vectors includes:
      determining, for each of the multiple users, first probabilities associated with the one or more devices being manufactured by each of a plurality of device manufacturers, and
      generating, based on the first probabilities, a device manufacturer profiling vector of the multiple profiling vectors;
   clustering the multiple profiling vectors to identify cluster centers associated with a plurality of user groups, wherein the plurality of user groups includes a device manufacturer user group;
   determining first users of the multiple users for, or with, whom to perform certain actions or activities based on the first users' affinity with at least the device manufacturer group of the plurality of user groups; and
   performing the certain actions or activities with respect to the determined first users.

2. The method of claim 1, wherein performing the certain actions or activities with respect to the determined first users comprises at least one of the following:
   a) targeting software or firmware upgrades, or software patches, to the first users;
   b) targeting electronic notifications to the first users;
   c) providing recommendations to the first users regarding remedial measures to resolve network-related issues;
   d) targeting ad campaigns, network service upgrades, or device upgrades to the first users, and
   e) targeting electronic notifications, or software or firmware upgrades, to the first users regarding an occurrence of a network security event, or a network security vulnerability or risk.

3. The method of claim 1, wherein the device or network-related parameters comprises Technical Report 069 (TR-069) parameters associated with the one or more devices.

4. The method of claim 1, wherein the device or network-related parameters comprise a Medium Access Control (MAC) address and a host name associated with each of the one or more devices.

5. The method of claim 1, wherein generating the profiling vectors for each of the multiple users further comprises:
   extracting, for each of the one or more devices, an organizational unique identifier (OUI) from a media access control (MAC) address associated with each of the one or more devices; and
   mapping each of the OUIs to a device manufacturer name associated with each of the plurality of device manufacturers.

6. The method of claim 1, wherein generating the profiling vectors for each of the multiple users further comprises:
   determining, for each of the multiple users, second probabilities associated with the one or more devices being a category of device of a plurality of categories of devices; and
   generating a second profiling vector based on the determined second probabilities.

7. The method of claim 1, wherein clustering the multiple profiling vectors to identify cluster centers comprises:
   applying a K-means clustering technique to the multiple profiling vectors to identify the cluster centers associated with the plurality of user groups, where each of the cluster centers represent a centroid of a respective user group of the plurality of user groups.

8. The method of claim 1, wherein determining the first users comprises:
   identifying at least one user group associated with performance of the certain actions or activities;
   determining a Euclidian distance between each of the multiple user's profiling vectors and the identified cluster center of each of the plurality of user groups to generate an affinity score for each of the multiple users; and
   identifying the first users of the multiple users having a generated affinity score that indicates the first users' affinity with the at least the manufacturer group of the plurality of user groups.

9. A network device, comprising:
   a communication interface coupled to a network; and
   one or more processors, or logic, configured to:
      determine when multiple users each connect to a network using one or more devices,
      obtain device or network-related parameters associated with the one or more devices,
      generate profiling vectors for each of the multiple users, that connects to the network using the one or more devices, to produce multiple profiling vectors, wherein to generate the one or more processors, or logic, are configured to:
- determine, for each of the multiple users, first probabilities associated with the one or more devices being manufactured by each of a plurality of device manufacturers, and
- generate, based on the first probabilities, a device manufacturer profiling vector of the multiple profiling vectors, cluster the multiple profiling vectors to identify cluster centers associated with a plurality of user groups, wherein the plurality of user groups includes a device manufacturer user group, determine first users of the multiple users for, or with, whom to perform certain actions or activities based on the first users' affinity with at least the device manufacturer group of the plurality of user groups, and perform, via the communication interface, the certain actions or activities with respect to the determined first users.

10. The network device of claim 9, wherein, when performing the certain actions or activities with respect to the determined first users, the one or more processors, or logic, is further configured to perform at least one of the following:
a) target software or firmware upgrades, or software patches, to the first users;
b) target electronic notifications to the first users;
c) provide recommendations to the first users regarding remedial measures to resolve network-related issues;
d) target ad campaigns, network service upgrades, or device upgrades to the first users, or
e) target electronic notifications, or software or firmware upgrades, to the first users regarding an occurrence of a network security event, or a network security vulnerability or risk.

11. The network device of claim 9, wherein the device or network-related parameters comprises Technical Report 069 (TR-069) parameters associated with the one or more devices, and wherein the TR-069 parameters comprise a Medium Access Control (MAC) address and a host name associated with each of the one or more devices.

12. The network device of claim 9, wherein, when generating the profiling vectors for each of the multiple users, the one or more processors, or logic, is further configured to:
- extract, for each of the one or more devices, an organizational unique identifier (OUI) from a media access control (MAC) address associated with each of the one or more devices,
- map each of the OUIs to a device manufacturer name associated with each of the plurality of device manufacturers,
- determine, for each of the multiple users, second probabilities associated with the one or more devices being a category of device of a plurality of categories of devices, and
- generate a second profiling vector based on the determined second probabilities.

13. The network device of claim 9, wherein, when clustering the multiple profiling vectors to identify cluster centers, the one or more processors, or logic, is further configured to:
- apply a K-means clustering technique to the multiple profiling vectors to identify the cluster centers associated with the plurality of user groups, where each of the cluster centers represent a centroid of a respective user group of the plurality of user groups.

14. The network device of claim 9, wherein, when determining the first users, the one or more processors, or logic, is further configured to:
- identify at least one user group associated with performance of the certain actions or activities,
- determine a Euclidian distance between each of the multiple user's profiling vectors and the identified cluster center of each of the plurality of user groups to generate an affinity score for each of the multiple users, and
- identify the first users of the multiple users having a generated affinity score that indicates the first users' affinity with the at least the manufacturer group of the plurality of user groups.

15. A non-transitory storage medium storing instructions executable by a network device, wherein the instructions comprise instructions to cause the network device to:
- determine when multiple users each connect to a network using one or more devices;
- obtain device or network-related parameters associated with the one or more devices;
- generate profiling vectors for each of the multiple users, that connects to the network using the one or more devices, to produce multiple profiling vectors, wherein the instructions to cause the network device to generate the profiling vectors, further cause the network device to:
  - determine, for each of the multiple users, first probabilities associated with the one or more devices being manufactured by each of a plurality of device manufacturers, and
  - generate, based on the first probabilities, a device manufacturer profiling vector of the multiple profiling vectors;
- cluster the multiple profiling vectors to identify cluster centers associated with a plurality of user groups, wherein the plurality of user groups includes a device manufacturer user group;
- determine first users of the multiple users for, or with, whom to perform certain actions or activities based on the first users' affinity with at least the device manufacturer group of the plurality of user groups; and
- perform the certain actions or activities with respect to the determined first users.

16. The non-transitory storage medium of claim 15, wherein the instructions to cause the network device to perform the certain actions or activities with respect to the determined first users further comprise instructions to cause the network device to perform at least one of:
a) target software or firmware upgrades, or software patches, to the first users;
b) target electronic notifications to the first users;
c) provide recommendations to the first users regarding remedial measures to resolve network-related issues;
d) target ad campaigns, network service upgrades, or device upgrades to the first users, or
3) target electronic notifications, or software or firmware upgrades, to the first users regarding an occurrence of a network security event, or a network security vulnerability or risk.

17. The non-transitory storage medium of claim 15, wherein the device or network-related parameters comprise Technical Report 069 (TR-069) parameters associated with the one or more devices, and wherein the TR-069 parameters comprise a Medium Access Control (MAC) address and a host name associated with each of the one or more devices.

18. The non-transitory storage medium of claim 15, wherein the instructions to cause the network device to generate the profiling vectors for each of the multiple users further comprise instructions to cause the network device to:

extract, for each of the one or more devices, an organizational unique identifier (OUI) from a media access control (MAC) address associated with each of the one or more devices, map each of the OUIs to a device manufacturer name associated with each of the plurality of device manufacturers, determine, for each of the multiple users, second probabilities associated with the one or more devices being a category of device of a plurality of categories of devices; and generate a second profiling vector based on the determined second probabilities.

19. The non-transitory storage medium of claim 15, wherein the instructions to cause the network device to cluster the multiple profiling vectors to identify cluster centers further comprise instructions to:

apply a K-means clustering technique to the multiple profiling vectors to identify the cluster centers associated with the plurality of user groups, where each of the cluster centers represents a centroid of a respective user group of the plurality of user groups.

20. The non-transitory storage medium of claim 15, wherein the instructions to cause the network device to determine the first users further comprise instructions to:

identify at least one user group associated with performance of the certain actions or activities;

determine a Euclidian distance between each of the multiple user's profiling vectors and the identified cluster center of each of the plurality of user groups to generate an affinity score for each of the multiple users; and identify the first users of the multiple users having a generated affinity score that indicates the first users' affinity with the at least the manufacturer group of the plurality of user groups.

\* \* \* \* \*